United States Patent
Zhao et al.

(10) Patent No.: US 12,374,091 B2
(45) Date of Patent: Jul. 29, 2025

(54) TRAINING A RESTORATION MODEL FOR BALANCED GENERATION AND RECONSTRUCTION

(71) Applicant: Google LLC, Mountain View, CA (US)

(72) Inventors: Yang Zhao, Bothell, WA (US); Yu-Chuan Su, Kirkland, WA (US); Chun-Te Chu, Bellevue, WA (US); Yandong Li, Orlando, FL (US); Marius Renn, Milpitas, CA (US); Yukun Zhu, Shoreline, WA (US); Xuhui Jia, Seattle, WA (US); Bradley Ray Green, Bellevue, WA (US)

(73) Assignee: GOOGLE LLC, Mountain View, CA (US)

(*) Notice: Subject to any disclaimer, the term of this patent is extended or adjusted under 35 U.S.C. 154(b) by 791 days.

(21) Appl. No.: 17/572,923

(22) Filed: Jan. 11, 2022

(65) Prior Publication Data
US 2023/0222628 A1 Jul. 13, 2023

(51) Int. Cl.
G06T 5/00 (2024.01)
G06V 40/16 (2022.01)

(52) U.S. Cl.
CPC .............. *G06T 5/00* (2013.01); *G06V 40/168* (2022.01); *G06T 2207/20081* (2013.01); *G06T 2207/20084* (2013.01); *G06T 2207/30201* (2013.01)

(58) Field of Classification Search
CPC . G06T 2207/20081; G06T 2207/20084; G06T 2207/30201; G06T 5/00; G06T 5/60; G06V 10/82; G06V 40/168
See application file for complete search history.

(56) References Cited

U.S. PATENT DOCUMENTS

| | | | |
|---|---|---|---|
| 2014/0314324 A1* | 10/2014 | Tian | G06V 10/462 382/197 |
| 2020/0372686 A1* | 11/2020 | Wen | G06T 9/002 |
| 2022/0392025 A1* | 12/2022 | Mironica | G06T 5/50 |
| 2023/0044644 A1* | 2/2023 | Elbaz | G06T 15/04 |
| 2023/0055204 A1* | 2/2023 | Ungureanu | G06T 11/001 |
| 2023/0135021 A1* | 5/2023 | Fang | G06F 16/903 706/12 |

OTHER PUBLICATIONS

Zhang, Xinyi, et al. "Gated fusion network for joint image deblurring and super-resolution." arXiv preprint arXiv:1807.10806 (2018). (Year: 2018).*

(Continued)

*Primary Examiner* — Michael J Vanchy, Jr.
(74) *Attorney, Agent, or Firm* — DORITY & MANNING, P.A.

(57) ABSTRACT

Systems and methods for training a restoration model can leverage training for two sub-tasks to train the restoration model to generate realistic and identity-preserved outputs. The systems and methods can balance the training of the generation task and the reconstruction task to ensure the generated outputs preserve the identity of the original subject while generating realistic outputs. The systems and methods can further leverage a feature quantization model and skip connections to improve the model output and overall training.

19 Claims, 11 Drawing Sheets

(56) References Cited

OTHER PUBLICATIONS

Abadi et al., "TensorFlow: Large-Scale Machine Learning on Heterogeneous Distributed Systems", arXiv:1603.04467v1, Preliminary White Paper, Nov. 9, 2015, 19 pages.
Brock et al., "Large Scale GAN Training for High Fidelity Natural Image Synthesis", arXiv:1809.11096v2, Feb. 25, 2019, 25 pages.
Bulat et al., "Super-FAN: Integrated Facial Landmark Localization and Super-Resolution of Real-World Low Resolution Faces in Arbitrary Poses with GANs", Proceedings of the IEEE Conference on Computer Vision and Pattern Recognition (CVPR), 2018, pp. 109-117.
Chen et al., "Progressive Semantic-Aware Style Transformation for Blind Face Restoration", arXiv:2009.08709v2, Mar. 21, 2021, 21 pages.
Choi et al., "StarGAN v2: Diverse Image Synthesis for Multiple Domains", arXiv:1912.01865v2, Apr. 26, 2020, 14 pages.
Esser et al., "Taming Transformers for High-Resolution Image Synthesis", arXiv:2012.09841v3, Jun. 23, 2021, 52 pages.
Gatys et al., "Image Style Transfer Using Convolutional Neural Networks", 2016 IEEE Conference on Computer Vision and Pattern Recognition (CVPR), Jun. 27-30, 2016, 10 pages.
Goodfellow et al., "Generative Adversarial Networks", arXiv:1406.2661v1, Jun. 10, 2021, 9 pages.
Gu et al., "Image Processing Using Multi-Code GAN Prior", arXiv:1912.07116v2, Mar. 31, 2020, 10 pages.
Guo et al., "Deep Wavelet Prediction for Image Super-resolution", 2017 IEEE Conference on Computer Vision and Pattern Recognition Workshops (CVPRW), Jul. 21-26, 2017, Honolulu, Hawaii, 10 pages.
Guo et al., "Toward Convolutional Blind Denoising of Real Photographs", arXiv:1807.04686v2, Apr. 19, 2019, 11 pages.
Heusel et al., "GANs Trained by a Two Time-Scale Update Rule Converge to a Local Nash Equilibrium", arXiv:1706.08500v6, Jan. 12, 2018, 38 pages.
Johnson et al., "Perceptual Losses for Real-Time Style Transfer and Super-Resolution", arXiv:1603.08155v1, Mar. 27, 2016, 18 pages.
Karras et al., "A Style-Based Generator Architecture for Generative Adversarial Networks", arXiv:1812.04948v3, Mar. 9, 2019, 12 pages.
Karras et al., "Analyzing and Improving the Image Quality of StyleGAN", arXiv:1912.04958v2, Mar. 23, 2020, 21 pages.
Kingma et al., "Adam: A Method for Stochastic Optimization", arXiv:1412.6980v9, Jan. 30, 2017, 15 pages.
Kupyn et al., "DeblurGAN-v2: Deblurring (Orders-of-Magnitude) Faster and Better", arXiv:1908.03826v1, Aug. 10, 2019, 10 pages.
Kynkäänniemi et al., "Improved Precision and Recall Metric for Assessing Generative Models", arXiv:1904.06991v3, Oct. 30, 2019, 16 pages.
Li et al., "Learning Warped Guidance for Blind Face Restoration", arXiv:1804.04829v2, Apr. 16, 2018, 25 pages.
Li et al., "Blind Face Restoration via Deep Multi-scale Component Dictionaries", arXiv:2008.00418v1, Aug. 2, 2020, 16 pages.
Ma et al., "Deep Face Super-Resolution with Iterative Collaboration between Attentive Recovery and Landmark Estimation", arXiv:2003.13063v1, Mar. 29, 2020, 13 pages.
Menon et al., "PULSE: Self-Supervised Photo Upsampling via Latent Space Exploration of Generative Models", arXiv:2003.03808v3, Jul. 20, 2020, 20 pages.
Van den Oord et al., "Neural Discrete Representation Learning", arXiv:1711.00937v2, May 30, 2018, 11 pages.
Parmar et al., "On Aliased Resizing and Surprising Subtleties in GAN Evaluation", arXiv:2104.11222v3, Jan. 21, 2022, 15 pages.
Ramesh et al., "Zero-Shot Text-to-Image Generation", arXiv:2102.12092v2, Feb. 26, 2021, 20 pages.
Razavi et al., "Generating Diverse High-Fidelity Images with VQ-VAE-2", arXiv:1906.00446v1, Jun. 2, 2019, 15 pages.
Richardson et al., "Encoding in Style: A StyleGAN Encoder for Image-to-Image Translation", arXiv:2008.00951v2, Apr. 21, 2021, 21 pages.
Schroff et al., "FaceNet: A Unified Embedding for Face Recognition and Clustering", arXiv:1503.03832v3, Jun. 17, 2015, 10 pages.
Shen et al., "Deep Semantic Face Deblurring", arXiv:1803.03345v2, Mar. 16, 2018, 10 pages.
Simonyan et al., "Very Deep Convolutional Networks for Large-Scale Image Recognition", arXiv:1409.1556v6, Apr. 10, 2015, 14 pages.
Szegedy et al., "Going Deeper with Convolutions", arXiv:1409.4842v1, Sep. 17, 2014, 12 pages.
Wang et al., "ESRGAN: Enhanced Super-Resolution Generative Adversarial Networks", arXiv:1809.00219v2, Sep. 17, 2018, 23 pages.
Wang et al., "Towards Real-World Blind Face Restoration with Generative Facial Prior", Proceedings of the IEEE/CVF Conference on Computer Vision and Pattern Recognition (CVPR), 2021, pp. 9168-9178.
Yang et al., "GAN Prior Embedded Network for Blind Face Restoration in the Wild", Proceedings of the IEEE/CVF Conference on Computer Vision and Pattern Recognition (CVPR), 2021, pp. 672-681.
Yang et al., "HiFaceGAN: Face Renovation via Collaborative Suppression and Replenishment", arXiv:2005.05005v2, May 22, 2021, 10 pages.
Yasarla et al., "Deblurring Face Images Using Uncertainty Guided Multi-Stream Semantic Networks", arXiv:1907.13106.v2, Apr. 20, 2020, 13 pages.
Yu et al., "Generative Image Inpainting with Contextual Attention", arXiv:1801.07892v2, Mar. 21, 2018, 15 pages.
Zhang et al., "FFDNet: Toward a Fast and Flexible Solution for CNN based Image Denoising", arXiv:1710.04026v2, May 22, 2018, 15 pages.
Zhang et al., "The Unreasonable Effectiveness of Deep Features as a Perceptual Metric", arXiv:1801.03924v2, Apr. 10, 2018, 14 pages.
Zhao et al., "Differentiable Augmentation for Data-Efficient GAN Training", arXiv:2006.10738v4, Dec. 7, 2020, 23 pages.
Zhao et al., "Large Scale Image Completion via Co-Modulated Generative Adversarial Networks", arXiv:2103.10428v1, Mar. 18, 2021, 25 pages.
Zhao et al., "Feature Quantization Improves GAN Training", arXiv:2004.02088v2, Jul. 15, 2020, 22 pages.
Zheng et al., "Pluralistic Image Completion", arXiv:1903.04227v2, Apr. 5, 2019, 21 pages.

\* cited by examiner

TRAINING A RESTORATION MODEL FOR BALANCED GENERATION AND RECONSTRUCTION

FIELD

The present disclosure relates generally to training a machine-learned restoration model. More particularly, the present disclosure relates to training a restoration model for face generation and face reconstruction to teach the restoration model to output realistic images that preserve facial identities.

BACKGROUND

A model that can authentically restore a low-quality face image to a high-quality one can benefit many applications. While existing approaches for face restoration make significant progress in generating high-quality faces, the approaches may fail to preserve facial features that compromise the authenticity of reconstructed faces. Because the human visual system can be very sensitive to faces, even minor facial changes may alter the identity and significantly degrade the perceptual quality.

Some existing approaches can fail to preserve delicate facial features in the input but instead hallucinate a high-quality face that does not resemble the original subject. For example, the model may change the subject's eye color or change the eyelids from monolid to double eyelid. The changes may be negligible in pixel space and irrelevant for realisticness but essential for authenticity, which can lead to biometric characteristics deviating from the original subject, thus may significantly degrade the perceptual quality, especially for people familiar with the subject.

SUMMARY

Aspects and advantages of embodiments of the present disclosure will be set forth in part in the following description, or can be learned from the description, or can be learned through practice of the embodiments.

One example aspect of the present disclosure is directed to a computing system. The system can include one or more processors and one or more non-transitory computer-readable media that collectively store instructions that, when executed by the one or more processors, cause the computing system to perform operations. The operations can include obtaining an input image. In some implementations, the input image can include one or more features. The operations can include processing the input image with a first model to generate a first output. The first model can include an encoder model. The operations can include processing the first output with a second model to generate a second output. The second model can include a feature quantization model, and the second output can result from quantization of the first output by the feature quantization model. The operations can include processing the second output with a third model to generate a restoration output. In some implementations, the third model can include a decoder model, and the reconstruction output can include an output image.

In some implementations, the input image can include a degraded facial image, and the output image can include one or more predicted pixels. The feature quantization model can generate a feature embedding based on an input, can map the input to a known feature map, and can output the second output including a known feature of the known feature map.

In some implementations, the second output can include latent encoding data, and the latent encoding data can include a latent feature.

The input image can be descriptive of one or more faces, and the one or more features can be associated with one or more facial features descriptive of the one or more faces. In some implementations, the feature quantization model can include a codebook, and the codebook can include one or more learned feature codes.

In some implementations, the system can include a restoration model, and the restoration model can include the first model, the second model, and the third model. The restoration model can include a plurality of skip connections that generate a plurality of skip connection outputs, and the plurality of skip connection outputs can be processed by different decoder blocks of the decoder model to generate the restoration output.

The second output can include a quantized feature determined based on an extracted feature from the first output. In some implementations, processing the first output with the second model to generate the second output can include processing the first output with a feature extractor to generate a feature vector. The feature vector can be a vector mapped to an embedding space. In some implementations, processing the first output with the second model to generate the second output can include determining a stored vector associated with an embedding space location of the feature vector. The stored vector can be obtained from a different image than the input image. In some implementations, processing the first output with the second model to generate the second output can include outputting the second output. The second output can include the stored vector. The third model can include a linear gated feature fusion block.

Another example aspect of the present disclosure is directed to a computer-implemented method. The method can include obtaining, by a computing system including one or more processors, a training image. The training image can include one or more features. The method can include processing, by the computing system, the training image with a restoration model to generate a restoration output. In some implementations, processing the training image with the restoration model can include: processing, by the computing system, the training image with an encoder model to generate encoding data; processing, by the computing system, the encoding data with a feature quantization model to generate latent feature data; and processing, by the computing system, the latent feature data with a decoder model to generate a restoration output. The method can include evaluating, by the computing system, a loss function that evaluates a difference between the restoration output and the training image. The method can include adjusting, by the computing system, one or more parameters of the restoration model based at least in part on the loss function.

In some implementations, the feature quantization model can include an embedding feature map, and the embedding feature map can be associated with a feature quantization map descriptive of quantized features. Processing the encoding data with the encoder model can include generating, by the computing system, a feature embedding based on the encoding data. In some implementations, the feature embedding can be an embedding in an embedding space associated with the embedding feature map. Processing the encoding data with the encoder model can include determining, by the computing system, an associated quantized embedding in the feature quantization map based on the feature embedding and outputting, by the computing system, the latent feature data. In some implementations, the latent feature data can include the associated quantized embedding.

In some implementations, the decoder model can include a feature fusion block, and the feature fusion block can be configured to fuse the latent feature data and decoder data.

Another example aspect of the present disclosure is directed to one or more non-transitory computer-readable media that collectively store instructions that, when executed by one or more computing devices, cause the one or more computing devices to perform operations. The operations can include obtaining a training image. In some implementations, the training image can include one or more features. The operations can include processing the training image with a first model to generate a first output. The first model can include an encoder model. The operations can include processing the first output with a second model to generate a second output. In some implementations, the second model can include a feature quantization model. The operations can include processing the second output with a third model to generate a restoration output. In some implementations, the third model can include a decoder model. The operations can include evaluating a loss function that evaluates a difference between the restoration output and the training image and adjusting one or more parameters of at least one of the first model, the second model, or the third model based at least in part on the loss function.

In some implementations, the loss function can include a realism loss and a reconstruction loss. The realism loss can include a penalization term that encourages realistic output generation based on a determined realism based in part on a comparison with a real high-quality image. The reconstruction loss can include a penalization term that penalizes divergence from the training image. In some implementations, the operations can include generating a low-quality image based in part on the training image, and the low-quality image can be processed by the first model to generate the first output.

In some implementations, the operations can include generating a noisy output based on the first output. The noisy output can include noise, and the noisy output can be processed by the second model to generate the second output. In some implementations, the first output can be generated based at least in part on a skip connection, and the training image can be processed by one or more first blocks of the first model to generate the first output. In some implementations, the skip connection can pass the first output from the one or more first blocks of the first model to the second model.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
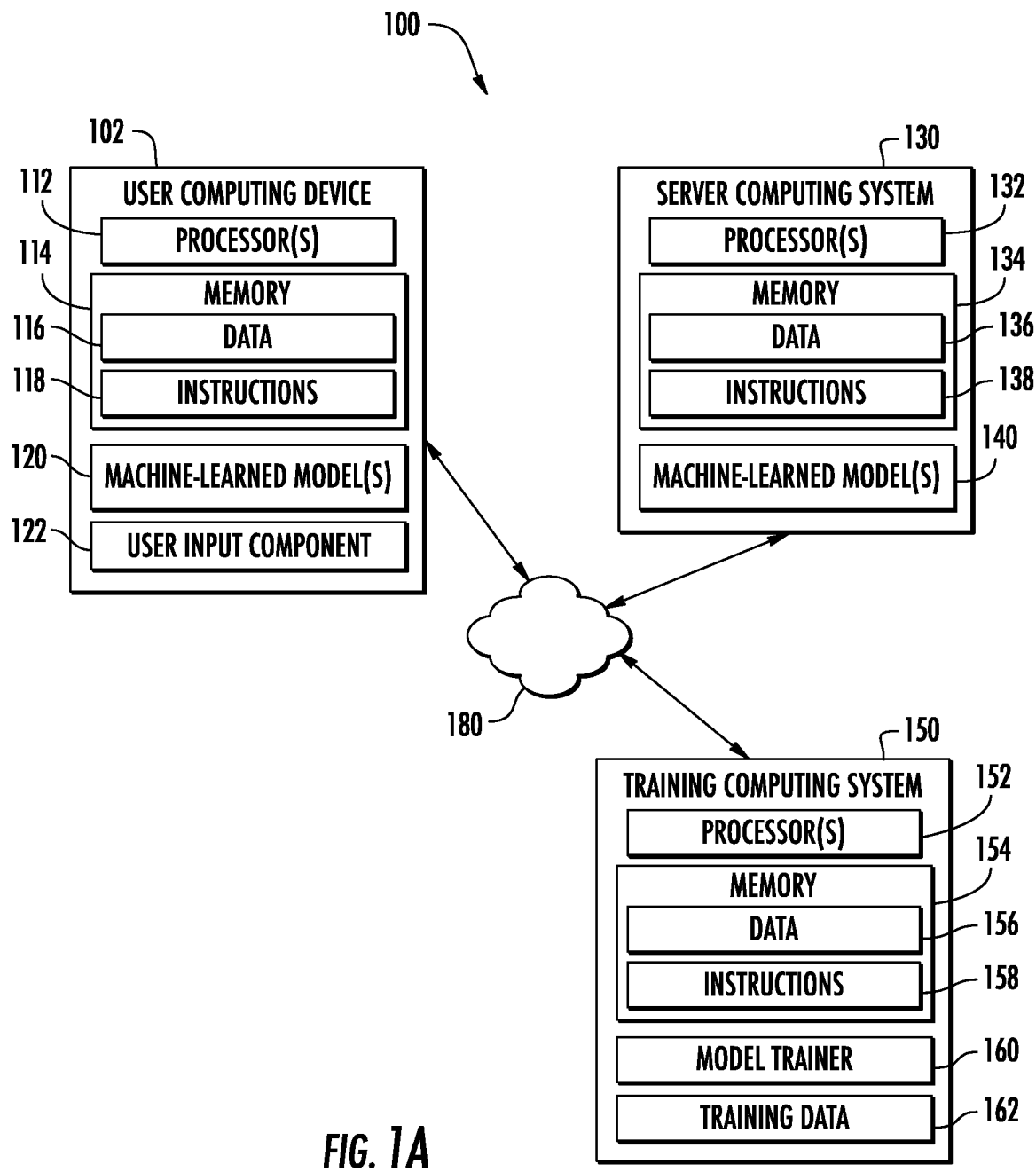
FIG. 1A depicts a block diagram of an example computing system that performs restoration output generation according to example embodiments of the present disclosure.

Reference numerals that are repeated across plural figures are intended to identify the same features in various implementations.

DETAILED DESCRIPTION

Overview

Generally, the present disclosure is directed to training a machine-learned model for restoration tasks. Training for the restoration task can include training focused on reconstruction tasks and generation tasks. The systems and methods disclosed herein can directly recover realistic face details from a low-quality image, without knowing degradation types or parameters. Moreover, the systems and methods can restore an image to increase resolution, correct or remove artefacts, and/or mitigate or remove degradations.

The systems and methods disclosed herein can be utilized to train and/or use a restoration model. The restoration model can be trained to intake an input image and output a restoration image. In some implementations, the input image may be a low-quality image, and the output image (e.g., the restoration image) may be a high-quality image. The restoration model can include one or more machine-learned models. For example, in some implementations, the restoration model can include a first model, a second model, and/or a third model. The first model can include an encoder model. The second model can include a feature quantizer. The third model can include a decoder model. In some implementations, the first model can be configured to receive image data, and each successive model can be configured to receive the output of the previous model.

The systems and methods disclosed herein can improve model training systems of machine-learned model tasks (e.g., face restoration tasks) by adaptively harnessing two sub-tasks: reconstruction and generation. For example, the systems and methods can include feature quantization. Feature quantization can help the model generalize to a severely degraded image. Therefore, the systems and methods can leverage a quantized codebook based on high-quality images, such that corrupted features in a low-quality image may be adequately enhanced by the codebook. In some implementations, the systems and methods can include linear gated feature fusion. Linear gated feature fusion can integrate information from both the encoder and the decoder to filter uninformative features. The systems and methods can integrate the global information from both features and can filter the feature combination with a confidence score.

The systems and methods disclosed herein can be utilized to train a restoration model. The restoration model can be configured to intake image data and produce an upscaled image output. For example, the systems and methods can obtain training data. The training data can include one or more training images. The one or more training images can include one or more features (e.g., one or more features descriptive of one or more facial features). A training image can be processed with a restoration model to generate a restoration output (e.g., a restored image). In some implementations, the restoration model can include one or more machine-learned models. For example, the restoration model can include three models. The training image can be processed with the first model (e.g., an encoder model) to generate a first output (e.g., encoding data). The first output can then be processed with a second model (e.g., a feature quantization model) to generate a second output (e.g., latent feature data). The second output can then be processed by a third model (e.g., a decoder model) to generate a restoration output (e.g., a high-quality image). The systems and methods can include evaluating a loss function that evaluates a difference between the restoration output and the training image. In some implementations, the systems and methods can include adjusting one or more parameters of the first model, the second model, and/or the third model based at least in part on the loss function.

In some implementations, the restoration model can be trained for face generation to learn the distribution of high-quality faces and for face reconstruction to learn to capture face characteristics from an image regardless of the quality. The training may train the restoration model to generate outputs with high perceptual realism (e.g., by learning the distribution of real high-quality images and by learning to map the distribution to the decoder which learns to generate a realistic image from a latent feature) and accurate identity preservation (e.g., by learning a feature extractor that projects an image to the latent feature space of the generation model such that the corresponding high-quality image may be generated from the extracted feature). In some implementations, the restoration model can include a U-Net architecture. Alternatively and/or additionally, in some implementations, the restoration model may include an encoder model, a feature quantization model, and a decoder model.

The systems and methods for training a restoration model can include obtaining a training image. The training image can include one or more features. In some implementations, the training image can be descriptive of one or more faces. Additionally and/or alternatively, the one or more features can be associated with one or more facial features descriptive of the one or more faces.

In some implementations, the systems and methods can include generating a low-quality image based in part on the training image. For example, the systems and methods may downsample the training image using one or more degradation models.

In some implementations, the training image can be part of a training dataset. The training dataset can include a normal random distribution. Additionally and/or alternatively the training image may be obtained at random from the training dataset. In some implementations, the training image may include noise (e.g., random gaussian noise). The noise may be added to a ground truth image to generate the training image.

Noise can be added to a ground truth image to generate the training image by processing the ground truth image with a noise block. The noise block can enable non-deterministic generation. The noise block can be configured to generate non-uniform inputs. The noise block may multiply random noise to the feature of each layer of the image data.

The training image can be processed with a restoration model to generate a restoration output. The restoration model can include an encoder model, a feature quantization model, and/or a decoder model.

Alternatively and/or additionally, the systems and methods can include processing the training image with a first model to generate a first output. The first model can include an encoder model. In some implementations, the first output can include encoding data. In some implementations, the low-quality image can be processed by the first model to generate the first output.

The first output can then be processed with a second model to generate a second output. The second model can include a feature quantization model. The feature quantization model may process the encoding data to generate latent feature data.

In some implementations, the second output can include latent encoding data, and the latent encoding data may include one or more latent features.

In some implementations, the systems and methods can generate a noisy output based on the first output. The noisy output can include noise (e.g., gaussian noise) added to one or more layers of the first output. The noisy output can then be processed by the second model to generate the second output.

The feature quantization model can include a codebook. The codebook can be utilized for dictionary based encoding. The codebook can include one or more learned feature codes. The one or more features can be one or more high-quality features (e.g., features obtained from a high resolution image).

In some implementations, the second output can include a quantized feature (e.g., high-quality feature) determined based on an extracted feature from the first output.

In some implementations, the feature quantization model can process the encoding data to determine if the input feature should be utilized or if a feature from a codebook should be utilized instead. Alternatively and/or additionally, the second output may include a latent vector generated based on a weighted combination of the input feature vector and a cataloged high-quality feature vector.

Processing the first output with the second model to generate the second output can include processing the first output with a feature extractor to generate a feature vector. The feature vector can be a vector mapped to an embedding space. The systems and methods can then determine a stored vector associated with an embedding space location of the feature vector. In some implementations, the stored vector can be obtained from a different image than the training image. The second output can then be output, in which the second output can include the stored vector.

Additionally and/or alternatively, the feature quantization model can include an embedding feature map. The embedding feature map can be associated with a feature quantization map descriptive of quantized features (e.g., high-quality features). Moreover, in some implementations, processing the encoding data with the encoder model can include generating a feature embedding based on the encoding data. The feature embedding may be an embedding in an embedding space associated with the embedding feature map. The systems and methods can include determining an associated quantized embedding in the feature quantization map based on the feature embedding. The latent feature data can then be output. The latent feature data may include the associated quantized embedding.

The second output can then be processed with a third model to generate a restoration output. The third model can include a decoder model. In some implementations, the latent feature data can be processed with the decoder model to generate a restoration output. The restoration output can include one or more images. The one or more images can include one or more high resolution images with prediction data.

In some implementations, the third model can include a linear gated feature fusion block. For example, a decoder model can include a feature fusion block. The feature fusion block can be configured to fuse the latent feature data and decoder data. The linear gated feature fusion block may learn to combine corresponding features of the encoder model and the decoder model. In some implementations, the feature fusion may be a weighted feature fusion.

Additionally and/or alternatively, the third model may include a modulation block. For example, in some implementations, the third model can include StyleGAN2 modulation. The modulation block may be trained to learn scaling for more accurate fusion (e.g., to learn to complete one to one feature addition). The third model may be trained to combine the final feature with previous feature maps.

The systems and methods can include evaluating a loss function that evaluates a difference between the restoration output and the training image. In some implementations, the loss function can include a realism loss and a reconstruction loss. The realism loss can include a penalization term that encourages realistic output generation based on a determined realism based in part on a comparison with a real high-quality image. Additionally and/or alternatively, the reconstruction loss can include a penalization term that penalizes divergence from the training image. The loss function may include an adversarial loss and one or more reconstruction losses.

Additionally and/or alternatively, the systems and methods can include adjusting one or more parameters of the restoration model. For example, the systems and methods can include adjusting one or more parameters of at least one of the first model, the second model, and/or the third model based at least in part on the loss function.

In some implementations, the systems and methods can include a plurality of encoder blocks of different levels and a plurality of decoder blocks of different levels. For example, the encoder model can include seven encoder blocks, and the decoder model may include seven decoder blocks. In some implementations, each encoder block may downsample the image by half, and each decoder block may upsample the image by half.

In some implementations, the systems and methods can include one or more training iterations. The one or more training iterations can include one or more skip connections. Additionally and/or alternatively, each skip connection may include a separate codebook for feature quantization. In some implementations, the system can include a plurality of encoder levels and a plurality of respective decoder layers. Each level of encoders and decoders may be tested by implementing skip connections. For example, a skip connection may be utilized at each level. Alternatively and/or additionally, higher resolution layers may not include skip connections. The skip connections can connect an encoder of a certain level to its respective decoder with a specific feature quantization block associated with that level. The skip connections can be utilized more frequently when training with heavily degraded images.

Additionally and/or alternatively, the first output can be generated based at least in part on a skip connection. The training image can be processed by one or more first blocks of the first model to generate the first output, and the skip connection can pass the first output from the one or more first blocks of the first model to the second model.

In some implementations, the systems and methods can include a restoration model that can include a first model (e.g., an encoder model), a second model (e.g., a feature quantization model), and a third model (e.g., a decoder model). Additionally and/or alternatively, the restoration model can include a plurality of skip connections that generate a plurality of skip connection outputs, and the plurality of skip connection outputs can be processed by different decoder blocks of the decoder model to generate the restoration output.

The trained restoration model can then be utilized to generate reconstructed data based on input data. For example, the systems and methods can include obtaining input data (e.g., an input image). The input data can include one or more features (e.g., one or more features descriptive of an object). The input data can be processed with the restoration model to generate a restoration output (e.g., a high resolution output image). Processing the input data with the restoration model can include processing the input data with a first model (e.g., an encoder model) to generate a first output (e.g., encoding data). The first output can be processed by a second model (e.g., a feature quantization model) to generate a second output (e.g., high-resolution feature data). The second output can be processed with a third model (e.g., a decoder model) to generate the restoration output.

The systems and methods can include obtaining an input image. The input image can include one or more features. For example, the one or more features can be descriptive of one or more facial features. Additionally and/or alternatively, the features may be descriptive of one or more faces. In some implementations, the input image may be a low-quality image with heavy pixelation, pixel corruption, and/or pixel occlusions.

The input image can be processed with a first model to generate a first output. The first model can include an encoder model.

The first output can then be processed with a second model to generate a second output. The second model can include a feature quantization model. In some implementations, the second output can result from quantization of the first output by the feature quantization model.

In some implementations, the feature quantization model can generate a feature embedding based on an input. The feature quantization model can then map the input to a known feature map. The feature quantization model can then output the second output. The second output can include a known feature of the known feature map.

The second output can be processed with a third model to generate a restoration output. The third model can include a decoder model. In some implementations, the restoration output can include an output image. The output image can include a higher quality than the input image.

In some implementations, the input image can include a degraded facial image, and the output image can include one or more predicted pixels.

The systems and methods of the present disclosure provide a number of technical effects and benefits. As one example, the system and methods can train a restoration model to generate high-quality image data. More specifically, the systems and methods can train a restoration for two sub-tasks (i.e., face generation and face reconstruction) in order to train the restoration model to generate realistic and identity-preserved image data. The training on the two sub-tasks can allow for the restoration model to generate high resolution images with realistic features while still generating facial features indicative of the identity of the original face.

Another technical benefit of the systems and methods of the present disclosure is the ability to leverage a feature quantization model that includes a codebook. For example, the systems and methods disclosed herein can utilize a feature quantization model that can map extracted feature vectors to a feature quantization map, which can then be utilized to identify similarly located high-quality feature vectors. The stored high-quality feature vectors can then be utilized in place of and/or in combination with the input feature vectors to generate higher resolution restoration outputs.

Another example technical effect and benefit relates to the reduction of computational cost and computational time. The systems and methods disclosed herein can utilize one or more skip connections to train the restoration model more efficiently, which can allow for higher quality outputs in less training iterations. For example, the skip connections can allow for training on less degraded inputs, while still training the different blocks of the model. Moreover, the systems and methods can utilize a noise block for generating random noise inputs for non-deterministic generation. The non-deterministic training can allow for training on smaller training datasets with mitigation of the overfitting problem of deterministic approaches.

With reference now to the Figures, example embodiments of the present disclosure will be discussed in further detail.

Example Devices and Systems

FIG. 1A depicts a block diagram of an example computing system 100 that performs restoration output generation according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more restoration models 120. For example, the restoration models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example restoration models 120 are discussed with reference to FIGS. 2-4.

In some implementations, the one or more restoration models 120 can be received from the server computing system 130 over network 180, stored in the user computing device memory 114, and then used or otherwise implemented by the one or more processors 112. In some implementations, the user computing device 102 can implement multiple parallel instances of a single restoration model 120 (e.g., to perform parallel restoration output generations across multiple instances of low-quality images).

More particularly, the restoration model can be trained to intake a low-quality image and output a restored high-quality image. In some implementations, the restoration model can include one or more encoder models, one or more feature quantization models, and one or more decoder models. The one or more encoder models can process an input image to generate encoding data. The encoding data can be processed by the one or more feature quantization models to generate latent feature data. The latent feature data can then be processed by the one or more decoder models to generate the restoration output. The resulting restoration output can include a high-quality image generated based at least in part on high-quality features from a codebook, which were determined as being associated with the input features based on an embedding location.

Additionally or alternatively, one or more restoration models 140 can be included in or otherwise stored and implemented by the server computing system 130 that communicates with the user computing device 102 according to a client-server relationship. For example, the restoration models 140 can be implemented by the server computing system 140 as a portion of a web service (e.g., an image restoration service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned restoration models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2-4.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the restoration models 120 and/or 140 based on a set of training data 162. The training data 162 can include, for example, one or more training images. In some implementations, the one or more training images can be part of a training dataset. Alternatively and/or additionally, the training images may be processed with a noise block to add noise (e.g., random gaussian noise) before processing. The training image may be processed with a degradation model to degrade the image before being processed.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). The input may include audio data and the output may comprise compressed audio data. In another example, the input includes visual data (e.g., one or more images or videos), the output comprises compressed visual data, and the task is a visual data compression task. In another example, the task may comprise generating an embedding for input data (e.g., input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
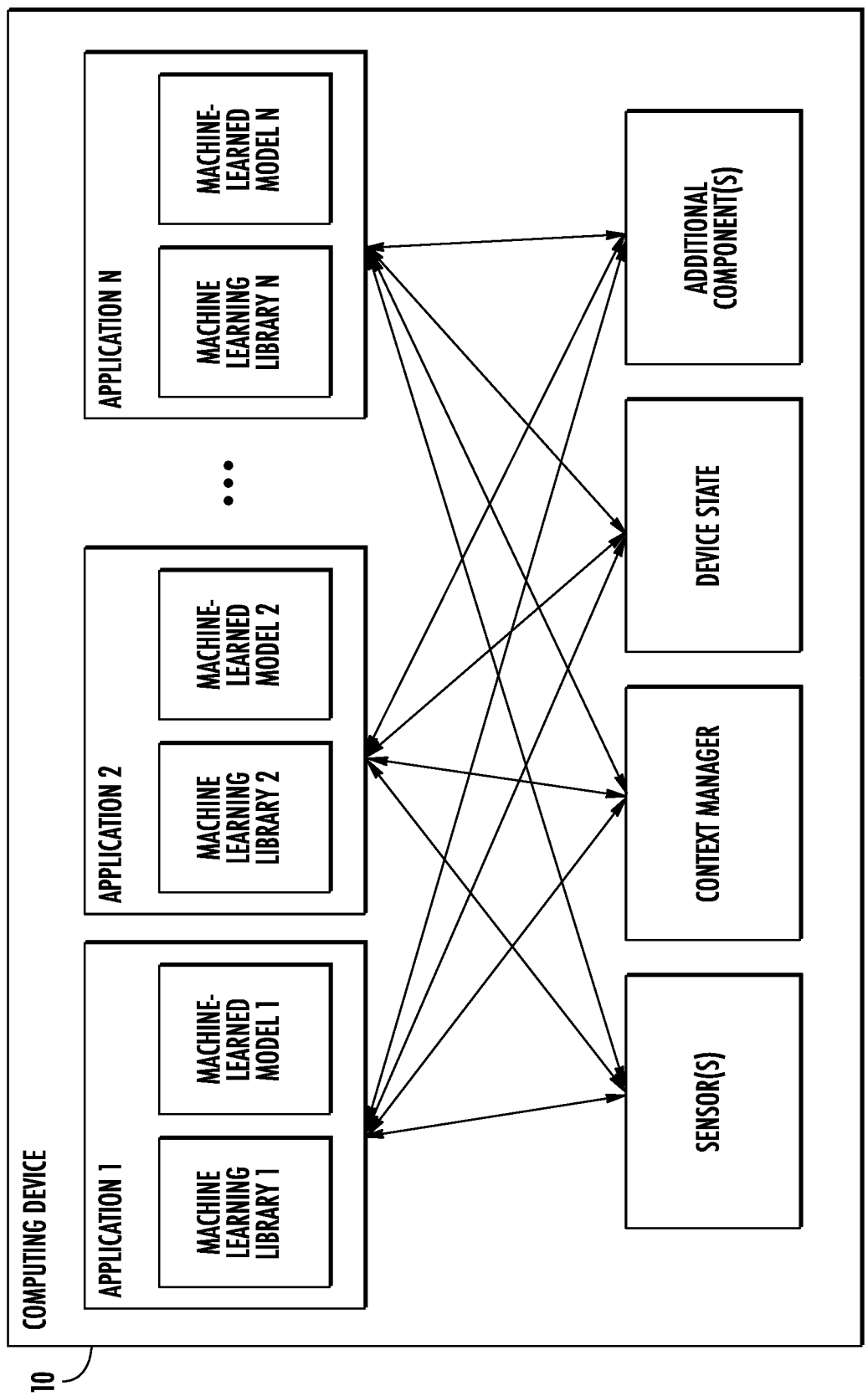
FIG. 1B depicts a block diagram of an example computing device that performs restoration output generation according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
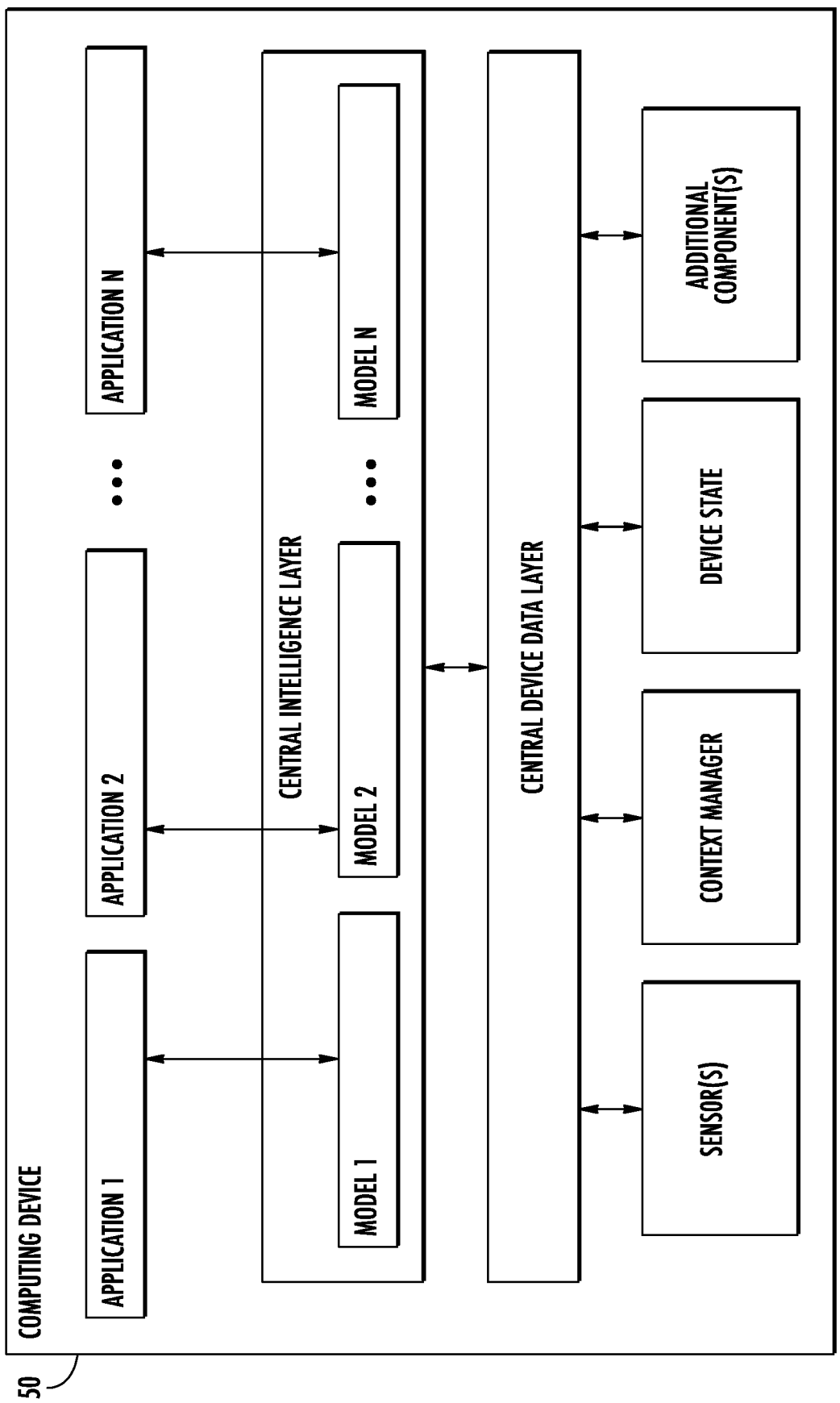
FIG. 1C depicts a block diagram of an example computing device that performs restoration output generation according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
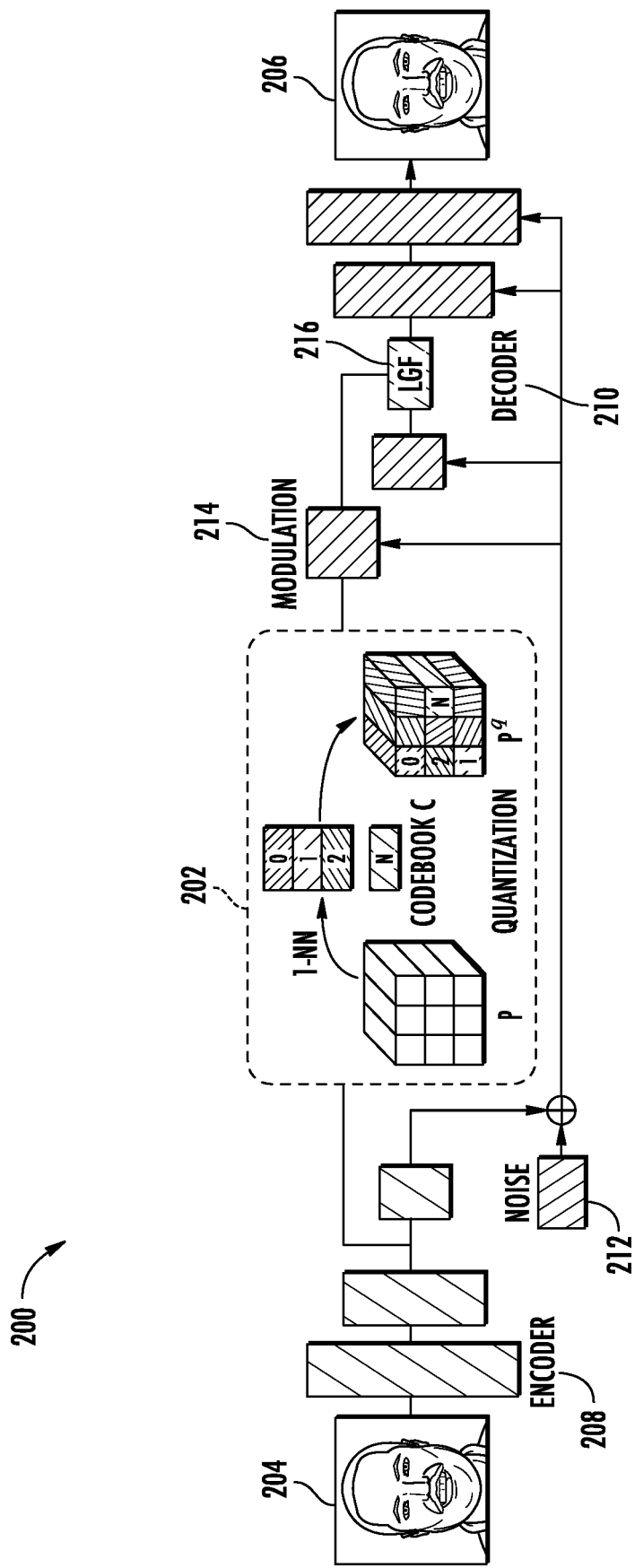
FIG. 2 depicts a block diagram of an example restoration model according to example embodiments of the present disclosure.

FIG. 2 depicts a block diagram of an example restoration model 200 according to example embodiments of the present disclosure. In some implementations, the restoration model 200 is trained to receive a set of input data 204 descriptive of an input image and, as a result of receipt of the input data 204, provide output data 206 that includes a restoration output. Thus, in some implementations, the restoration model 200 can include a feature quantization model 202 that is operable to map an input feature vector to a latent feature embedding space, which can then be compared against high-quality feature vectors of a codebook of features.

In particular, FIG. 2 depicts an example restoration model 200 with an encoder model 208, a feature quantization model 202, and a decoder model 210. The encoder model 208 can process the input image 204 with one or more encoder blocks (e.g., one or more encoder layers) to generate encoding data. The encoding data may be encoding data that is an output of only part of the plurality of encoder blocks of the encoder model 208.

The feature quantization model 202 can process the encoding data to generate latent feature data. The feature quantization model can utilize a codebook of learned feature codes to determine high-quality feature vectors associated with the encoding data. For example, the feature quantization model can process the encoding data to determine a location in an embedding space for the encoding data based on one or more features in the input image 204. The location can then be utilized to determine one or more high-quality feature vectors (e.g., learn feature vectors) associated with the one or more features in the input image 204 (e.g., with a 1-nearest neighbor search). The high-quality feature vectors can be included in the latent feature data.

In some implementations, the input image 204 may be processed with the encoder model 208 to generate second encoding data, which can be concatenated and/or multiplied with random gaussian noise from a noise block 212 to generate a noisy output.

The latent feature data and the noisy output can be modulated with a modulation block 214. In some implementations, the modulation block 214 can scale the obtained datasets for one to one addition.

The modulated latent feature data and the modulated noisy output can then be processed with a linear gated feature fusion block 216 to fuse the data and generate fused feature data. The fused feature data can then be processed with one or more decoder blocks of the decoder model 210 to generate a restoration output 206 (e.g., an improved resolution version of the input image 204).

The upper pipeline including the depicted feature quantization model 202 can depict a skip connection that skips the last encoder block and the first decoder block. In some implementations, the restoration model 200 can include a plurality of skip connections for the plurality of encoder and decoder levels. The outputs of the different skip connections can be processed by the decoder blocks of the decoder model 210 to generate the restoration output 206, in which each of the skip connection outputs can be utilized for the generation process.

In some implementations, random gaussian noise can be added at different levels of the decoder model 210.

Figure 3:
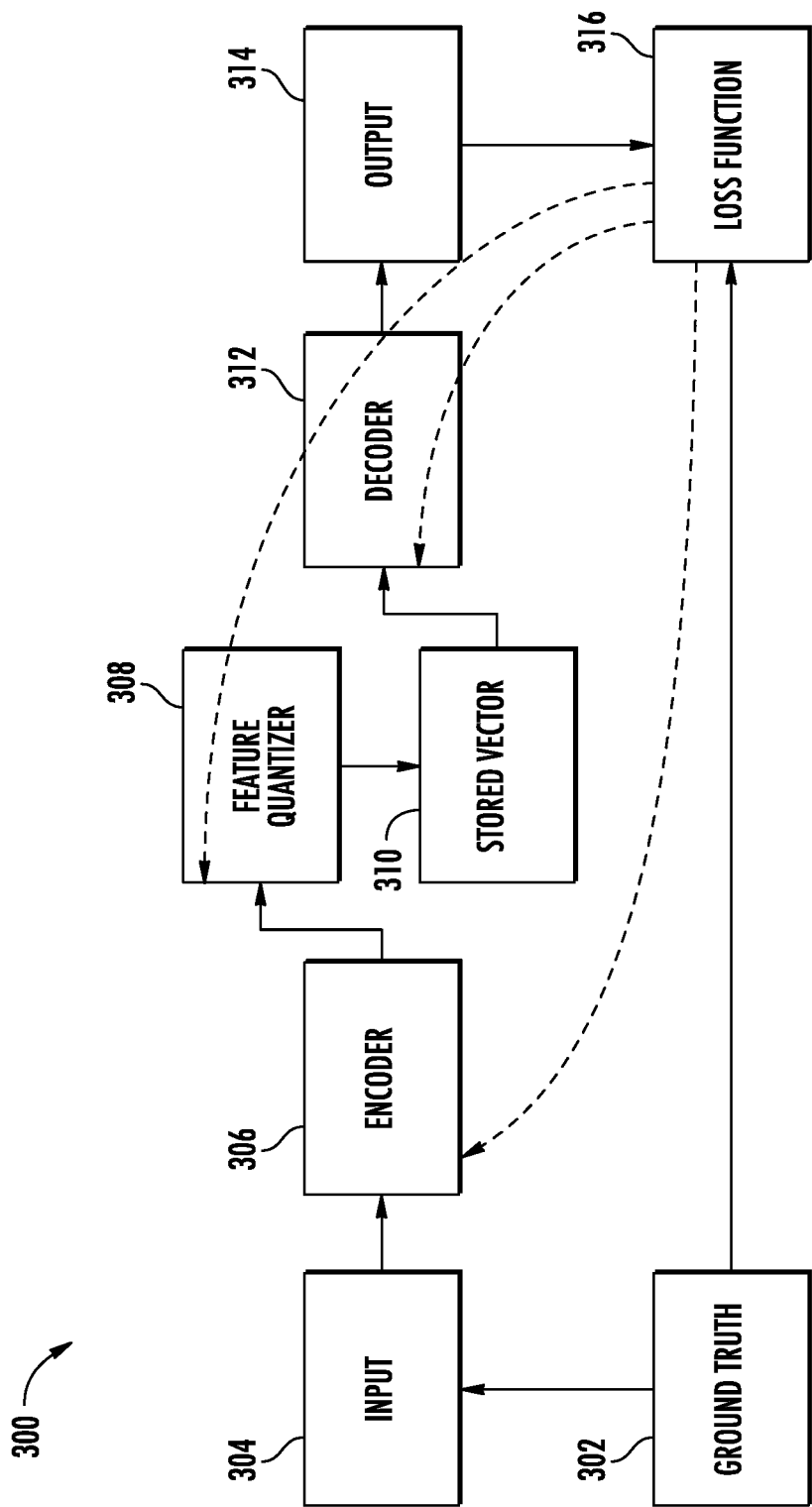
FIG. 3 depicts a block diagram of an example restoration model according to example embodiments of the present disclosure.

FIG. 3 depicts a block diagram of an example restoration model 300 according to example embodiments of the present disclosure. The restoration model 300 is similar to the restoration model 200 of FIG. 2 except that the restoration model 300 further includes a feature quantizer 308 paired with the stored vector 310.

More specifically, the restoration model 300 can include an encoder model 306, a feature quantization model 308, and a decoder model 312. In some implementations, a training input 304 can be generated for training the restoration model 300. The training input 304 can be generated by processing ground truth data 302 with a degradation model to degrade the ground truth data.

The training input 304 can be processed by the encoder model 306 to generate a first output including encoding data. The first output can then be processed by the feature quantization model 308 to generate a second output including a stored vector 310 from a learned feature quantization codebook. The second output can then be processed by the decoder model 312 to generate a restoration output 314.

The restoration output 314 and the ground truth data 302 can be compared in order to evaluate a loss function 316. The loss function 316 can include a realism loss and a reconstruction loss. The realism loss can evaluate the realism of the restoration output 314 compared to high resolution real world images. Additionally and/or alternatively, the reconstruction loss can determine a distance of divergence between the restoration output 314 and the ground truth data 302.

The evaluation of the loss function 316 can be utilized to determine a gradient descent, which can be backpropagated to one or more of the machine-learned models to adjust one or more parameters of the machine-learned model(s).

Figure 4:
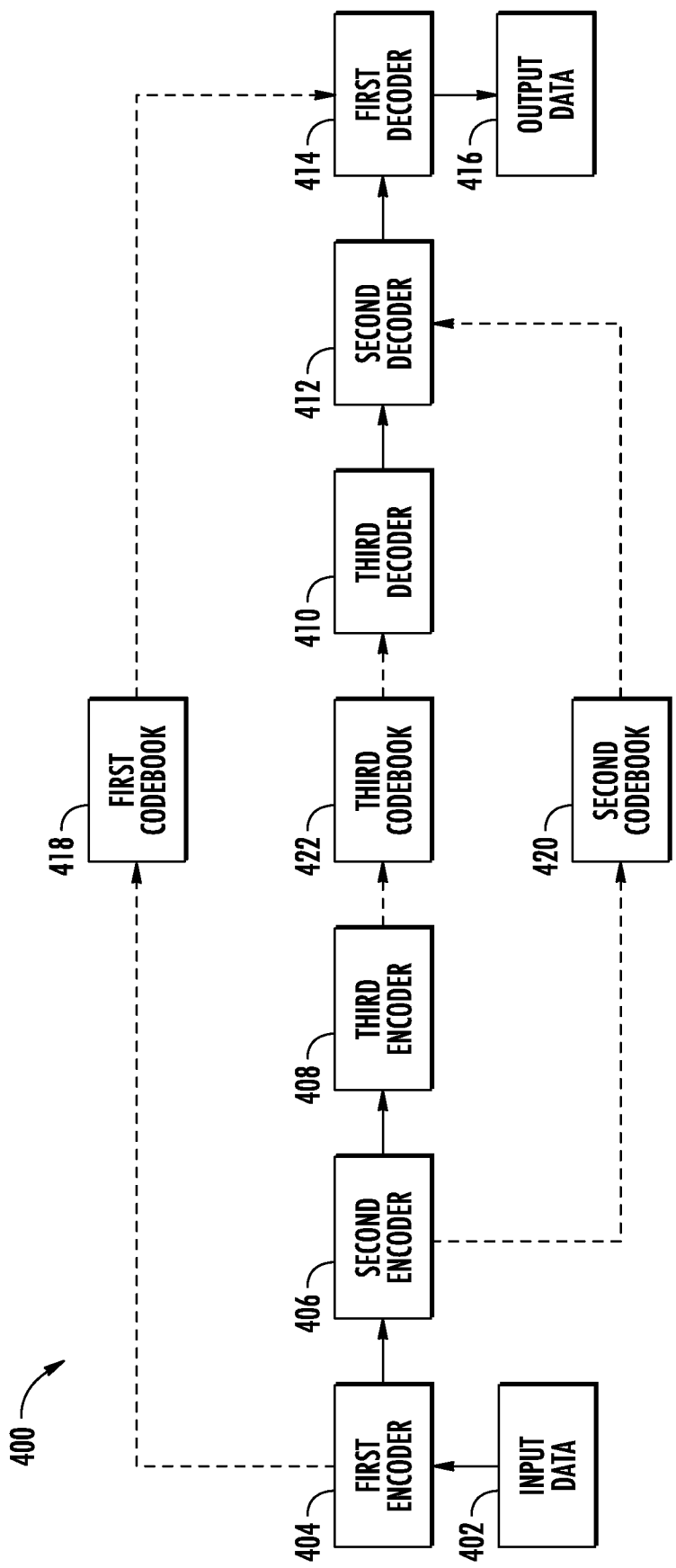
FIG. 4 depicts a block diagram of an example restoration model training with skip connections according to example embodiments of the present disclosure.

FIG. 4 depicts a block diagram of an example restoration model training with skip connections according to example embodiments of the present disclosure. Each respective skip connection can have a different feature quantization model. Alternatively and/or additionally, the skip connections may share a singular feature quantization model.

The restoration model training can include obtaining input data 402 (e.g., one or more training images). The input data 402 can be processed with a first encoder block 404 to generate a first encoder output. The first encoder output can be obtained by the first skip connection and may be obtained by a second encoder block 406.

The first skip connection can pass the first encoder output to the first feature quantization model which includes a first codebook 418. The first feature quantization model can output a first latent feature output.

Additionally and/or alternatively, the first encoder output can be processed by the second encoder block 406 to generate a second encoder output. The second encoder output can be obtained by the second skip connection and may be obtained by a third encoder block 408.

The second skip connection can pass the second encoder output to the second feature quantization model which includes a second codebook 420. The second feature quantization model can output a second latent feature output.

Additionally and/or alternatively, the second encoder output can be processed by the third encoder block 408 to generate a third encoder output. The third encoder output can then be processed by a third feature quantization model with a third codebook 422 to generate a third latent feature output.

The third latent feature output can then be processed by the third decoder block 410 to generate a third decoder output. The third decoder output and the second latent feature output can be processed by the second decoder block 412 to generate a second decoder output. Next, the second decoder output and the first latent feature output can be processed with the first decoder block 414 to generate output data 416 (e.g., restoration data descriptive of a restored image).

Each of the encoder blocks can be part of an encoder model, and each of the decoder blocks can be part of a decoder model. Additionally and/or alternatively, the second latent feature data and the third decoder output can be modulated and fused before being processed by the second decoder block 412. In some implementations, the first latent feature data and the second decoder output can be modulated and fused before being processed by the first decoder block 414.

Example Methods

Figure 6:
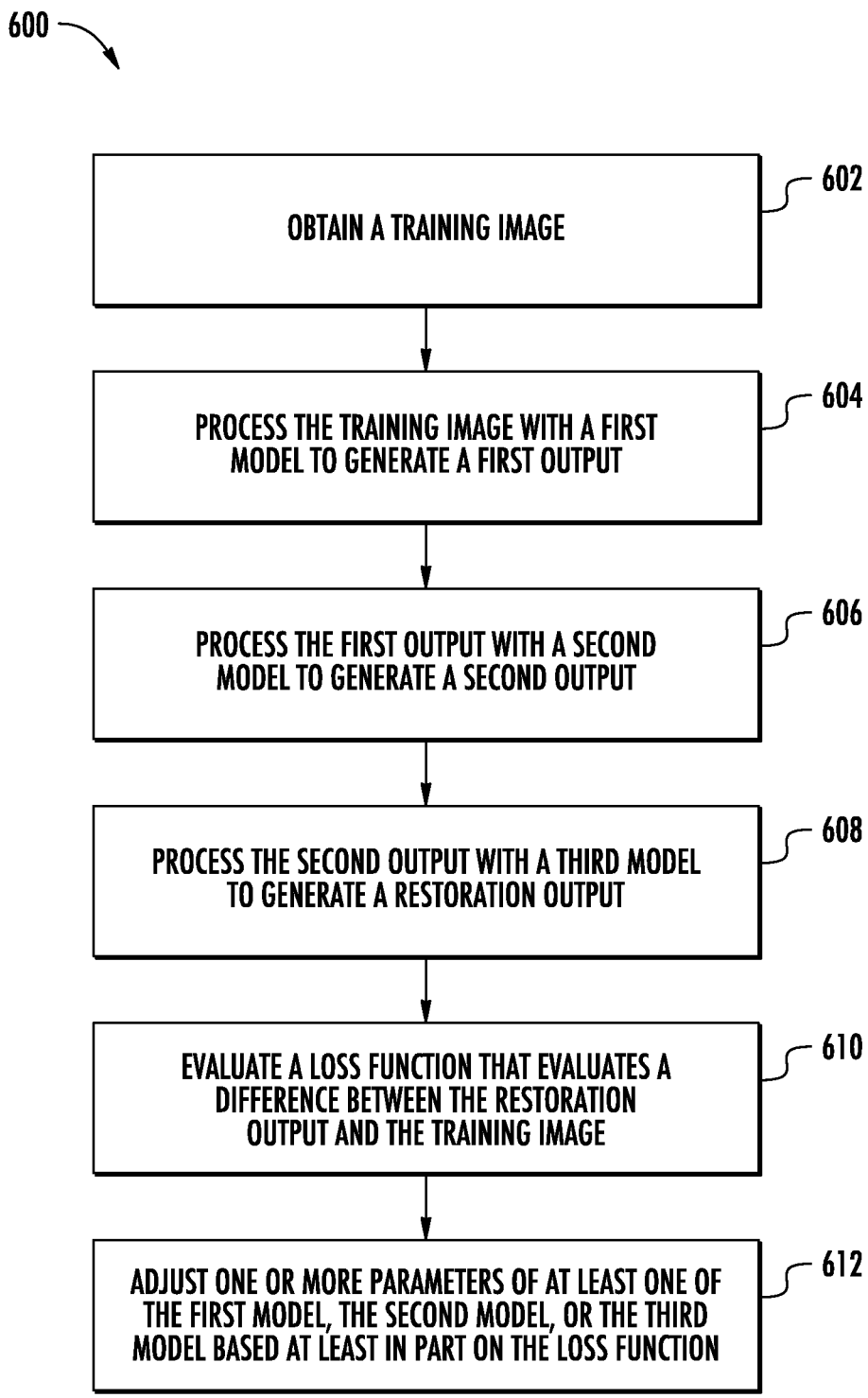
FIG. 6 depicts a flow chart diagram of an example method to perform restoration model training according to example embodiments of the present disclosure.

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

At 602, a computing system can obtain a training image. In some implementations, the training images can include one or more features. The one or more features may include one or more facial features. The one or more facial features may be descriptive of one or more faces.

The training image may be processed by a noise block to add noise (e.g., random gaussian noise) to the training image layers. Alternatively and/or additionally, the training image may be processed by a degradation model to generate a degraded image.

At 604, the computing system can process the training image with a first model to generate a first output. The first model can include an encoder model, and the first output can include encoding data. The encoding data may include data descriptive of one or more latent feature vectors. The first model may include one or more feature extractors.

In some implementations, the first output can be generated based at least in part on a skip connection. The training image can be processed by one or more first blocks of the first model to generate the first output, and the skip connection can cause the first output to be processed by the second model in place of one or more second blocks of the first model.

At 606, the computing system can process the first output with a second model to generate a second output. The second model can include a feature quantization model. In some implementations, the feature quantization model can include one or more feature extractors. The feature quantization model may include a learned high-quality feature codebook. The codebook can include a database of high-quality features. The codebook may include a feature quantization map associated with an embedding space. The feature quantization model may process the first output to determine a location in the embedding space for the first output. The location can then be utilized to determine a high-quality feature vector associated with the first output. Additionally and/or alternatively, the second output can include one or more high-quality feature vectors.

In some implementations, the computing system can add noise to the first output to generate a noisy output. The noisy output can then be processed by the second model to generate the second model.

At 608, the computing system can process the second output with a third model to generate a restoration output. The third model can include a decoder model. In some implementations, the restoration output can include a high-quality image of a face. In some implementations, the third model may include a modulation block and/or a linear gated feature fusion block.

At 610, the computing system can evaluate a loss function that evaluates a difference between the restoration output and the training image. The loss function can include a realism loss and/or a reconstruction loss. The realism loss can include a penalization term that can encourage realistic output generation based on a determined realism based in part on a comparison with a real high-quality image. The reconstruction loss can include a penalization term that penalizes divergence from the training image.

At 612, the computing system can adjust one or more parameters of at least one of the first model, the second model, or the third model based at least in part on the loss function.

In some implementations, training can involve one or more skip connections that can include the skipping of one or more encoder blocks and one or more decoder blocks.

Figure 7:
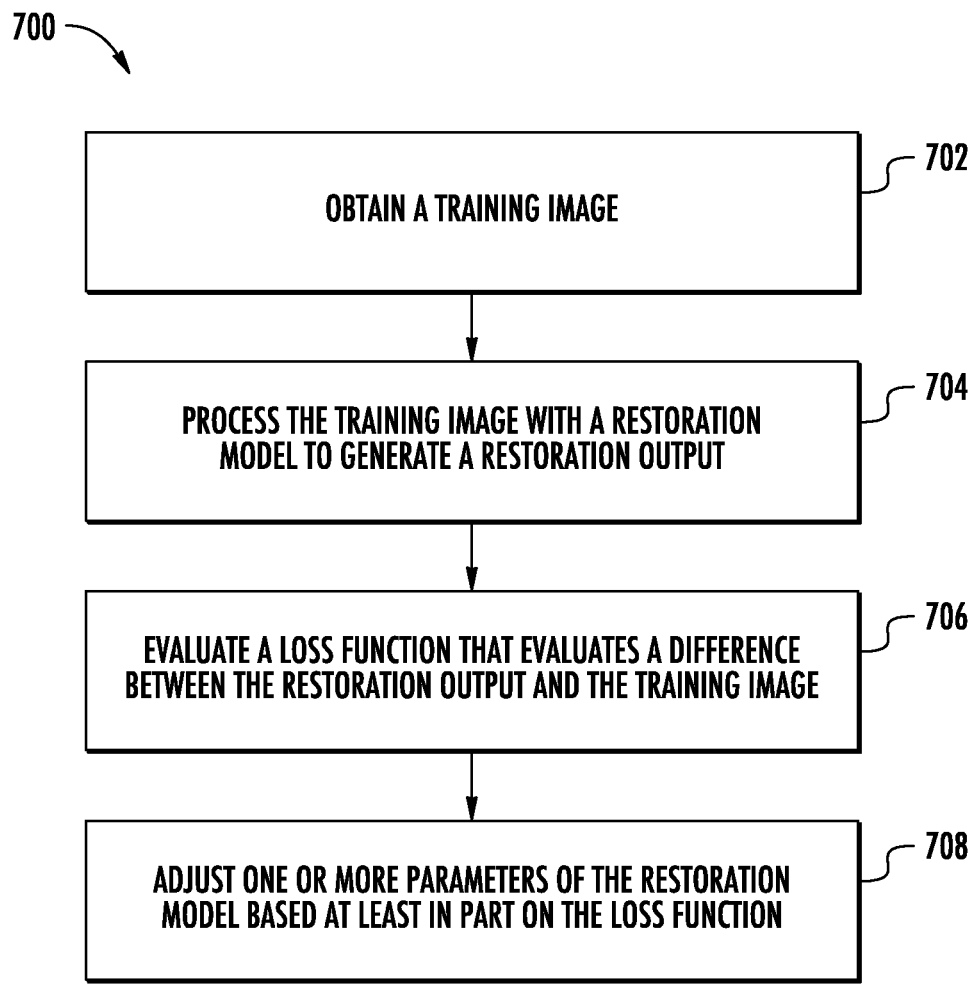
FIG. 7 depicts a flow chart diagram of an example method to perform restoration model training according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain a training image. The training image can include one or more faces.

At 704, the computing system can process the training image with a restoration model to generate a restoration output. The restoration model can include an encoder model, a feature quantization mode, and a decoder model. The encoder model can process the training image to generate encoding data. The feature quantization model can process the encoding data to generate latent feature data. The decoder model can process the latent feature data to generate the restoration output. The restoration output can include a high resolution restored image depicting the one or more faces.

At 706, the computing system can evaluate a loss function that evaluates a difference between the restoration output and the training image. The loss function can include an adversarial loss, an L1 loss, a perceptual loss, and/or reconstruction loss.

At 708, the computing system can adjust one or more parameters of the restoration model based at least in part on the loss function. The one or more parameters can be one or more parameters of at least one of the encoder model, the feature quantization model, and/or the decoder model.

Figure 8:
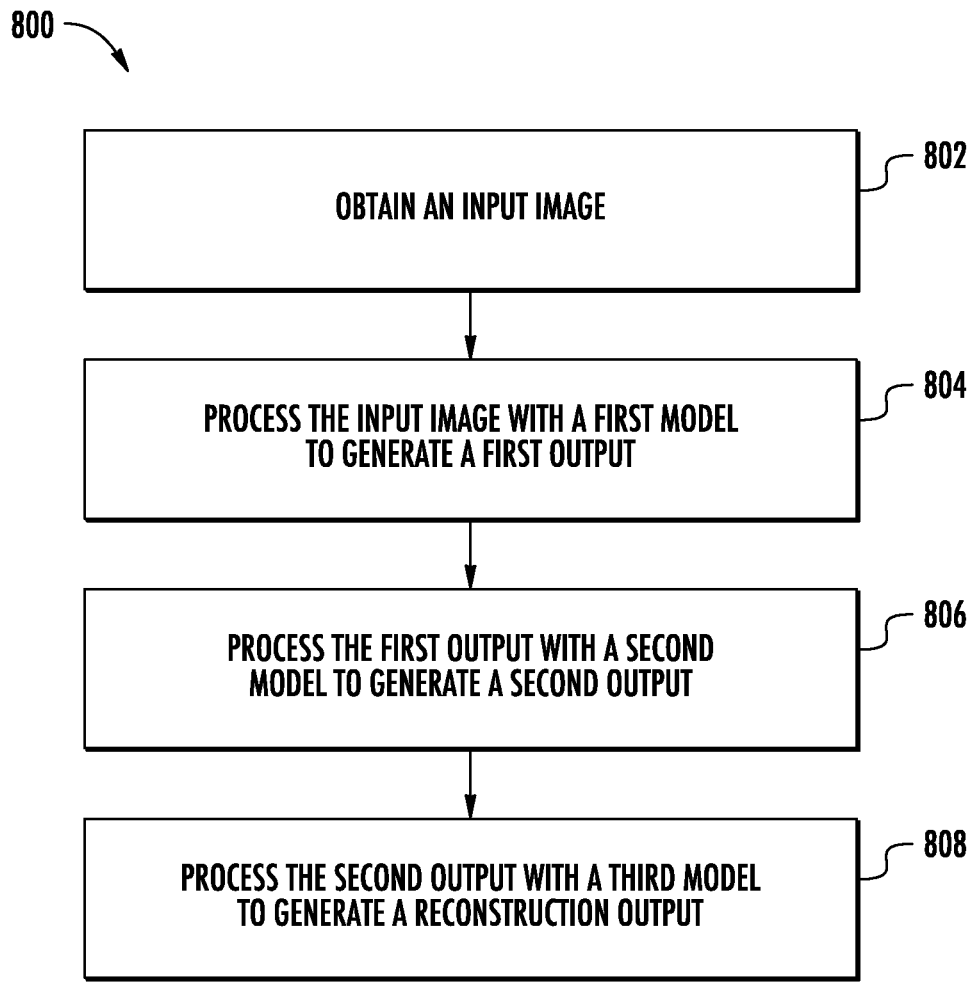
FIG. 8 depicts a flow chart diagram of an example method to perform restoration output generation according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain an input image. The input image can include one or more features. The one or more features can include one or more facial features descriptive of one or more faces. In some implementations, the input image may be a degraded image and/or a low-quality image.

At 804, the computing system can process the input image with a first model to generate a first output. The first model can include an encoder model including one or more encoder blocks. The first output can include encoding data.

At 806, the computing system can process the first output with a second model to generate a second output. The second model can include a feature quantization model, and the second output can include latent feature data. In some implementations, the second output can include, or be based on, latent feature data resulting from quantization of the first output by the feature quantization model. The feature quantization model can be configured to determine a high-quality feature vector associated with the input image, which can be used in place of or in combination with a determined input latent feature vector.

At 808, the computing system can process the second output with a third model to generate a reconstruction output. The third model can include a decoder model including one or more decoder blocks. The third model can include a modulation block and/or a linear gated feature fusion block. In some implementations, the restoration output can include one or more high-quality images (e.g., high-quality image including the one or more faces of the input image).

Example Implementations

The systems and methods disclosed herein can train a machine-learned model for the two sub-tasks of the face restoration problem (e.g., face generation and face reconstruction). Moreover, the systems and methods can train the model to learn the fragile balance between the two sub-tasks. In some implementations, the systems and methods can include a restoration model (e.g., a face restoration model) that can improve both generation and reconstruction by learning a stochastic model and enhancing the latent features. In some implementations, the systems and methods can adapt the number of skip connections for a better balance between the two sub-tasks. Besides the model improvement, the systems and methods disclosed herein may also introduce a new evaluation metric for measuring models' ability to preserve the identity in the restored faces. In some implementations, the systems and methods disclosed herein can train a model to produce higher quality faces while better preserving the identity.

Face images can play a critical role in daily life and can be at the very center of success for many applications such as portrait taking, face identification, etc. While these applications may usually rely on having decent quality faces as inputs, low-quality face images can be inevitable in the real world due to a variety of reasons (e.g., image resolution, motion blur, defocus blur, sensor noises, encoding artifacts, etc.). Therefore, a system that can faithfully restore a degraded face into a high-fidelity one regardless of the type of degradation may be highly desirable.

Some issues of existing approaches may be caused by the fragile balance between face generation and face restoration. The face restoration problem may include a combination of two sub-tasks (e.g., generation and reconstruction, where face generation can aim to learn the distribution of high-quality faces, and face reconstruction can aim to capture the face characteristic (e.g., shape and texture) from an image regardless of its quality). A model that overemphasizes generation and fails in reconstruction may hallucinate a face that does not belong to the subject. In contrast, a model that fails in generation can lead to unsatisfactory restoration quality. Therefore, a successful face restoration model may have to adequately address the two sub-tasks simultaneously.

Therefore, the systems and methods disclosed herein can aim to improve both generation and reconstruction. To improve face generation, the systems and methods can inject an adaptive conditional noise to the model. The noises can empower the restoration model with stochastic properties and can allow the model to capture the non-deterministic nature of the face restoration problem. To improve face reconstruction, the systems and methods can enhance the latent features in the skip connections of the U-Net architecture by 1) quantizing the features using a codebook learned from high-quality images and 2) introducing a global feature fusion module for an adaptive combination of the features from the decoder and the skip connections. In some implementations, the features extracted by the encoder may harm the reconstruction performance, especially when the input quality is poor.

The systems and methods disclosed herein can include an evaluation metric that measures both image quality and content preservation, where content preservation may be defined by the ability to preserve the identity. Experiment results demonstrate that the proposed metric can better correlate with the perceptual quality of human raters in the face restoration problem.

The synthesis of the system can begin with formulating the problem of face restoration and then introducing how to improve the generation and reconstruction sub-tasks. A denotation of an objective function for training can be described below.

Let X denote the degraded low-quality image domain, Y can denote the high-quality image domain, and $P_Y$ can denote the distribution of high-quality images. The system can assume that there exists a one-to-many degradation function Deg: Y→X, the goal of face restoration can be to learn an inverse function G: X→Y that satisfies $$\min_G D(P_{G(X)} \| P_Y) + \mathbb{E}_{y \sim Y} \mathbb{E}_{x \sim Deg(y)} \kappa(G(x), y), \quad (1)$$

where D can be a distribution distance measure and κ(·) can be a pair-wise distance between two images. The first half of Equation 1 can encourage the restored images to look realistic and be indistinguishable from real high-quality images. The second half of Equation 1 can encourage the restored image to preserve facial features in the high-quality image from which the input image can be degraded from. The systems and methods may include implementing G based on a U-Net architecture as illustrated in FIG. 2 and implementing the first and second half of Equation 1 using an adversarial loss and reconstruction losses respectively.

Equation 1 can show that the face restoration problem is a combination of the face generation and face reconstruction sub-task. The generation sub-task can be driven by D ($P_{G(X)} \| P_Y$) and can aim to learn the distribution of real high-quality images. The distribution can then be further mapped to the decoder in G, which can learn to generate realistic images from a latent feature. Alternatively and/or additionally, the reconstruction sub-task can be driven by $\mathbb{E}_{y \sim Y} \mathbb{E}_{x \sim Deg(y)} \kappa(G(x), y)$. In some implementations, the systems and methods can aim to learn a feature extractor that projects an image to the latent feature space of the generation model such that the corresponding high-quality image may be generated from the extracted feature. To restore images with different degradations, the feature extractor may be robust to the degradation in the input image.

The face reconstruction sub-task can include fine-grained control on face details in the generated image based on the input image. The fine-grained control can be achieved by conditioning the generation model using the latent features extracted by the encoder. For example, the skip connections in the U-Net architecture can pass low to high level information to the decoder for an authentic reconstruction of the input face.

The encoder may have issues with extracting useful low-level features from low-quality images, and the low-quality features hinder the restoration performance.

In some implementations, a face restoration model may put more emphasis on face generation than on reconstruction when there exists severe degradation in the input image and vice versa, because a severely degraded face may not contain sufficient details for reconstruction. Alternatively and/or additionally, skip connections may be used in the U-Net architecture to impose a strong condition on the generation model and may bias the model toward reconstruction. The more skip connections the system adds, starting from higher to lower layers, the stronger reconstruction the model may perform.

To improve the overall restoration performance, the systems and methods may re-balance the generation and reconstruction sub-task. The re-balancing can be achieved by reducing the number of skip connections, particularly skip connections in the lower layers, because low-level skip connections may tend to impose stronger conditions on the generation model and weaken its generalization ability. Furthermore, low-level features can tend to be less informative in low-quality inputs given that the information may be corrupted by the degradation.

To help the model generalize to severely degraded images, The systems and methods may enhance the features extracted by the encoder. In particular, the systems and methods may adopt a feature quantization approach for feature enhancement.

The idea can be that, given a codebook $C = \{c_k\}_{k=1}^{K}$, $c_k \in \mathbb{R}^d$ of high-quality features, the system can enhance a corrupted feature $p_{ij} \in \mathbb{R}^d$ by quantizing $p_{ij}$ to a code word $c_k$ in the codebook C. For example, the systems and methods can replace a feature extracted by the encoder that may be corrupted with a feature in the codebook such that the resulting quantized feature always consists of high-quality features.

The systems and methods may incorporate feature quantization into the model as follows. Given a learned codebook C and a feature map $p \in \mathbb{R}^{H \times W \times d}$ extracted by the encoder, the system can replace the feature vector at each spatial location $p_{ij}$ using its closest entry in C:

$$p_{ij}^q = \arg_{c_k} \min \| p_{ij} - c_k \|_2, \quad (2)$$

and the original feature map p can be replaced by the quantized feature map $p^q$ in the following operations (e.g., as depicted in FIG. 2).

In some implementations, the systems and methods can learn one codebook for each skip connection feature map during training by optimizing $$\mathcal{L}_{VQ} = \| sg(p) - p^q \|_2^2 + \| p - sg(p^q) \|_2^2, \quad (3)$$

where sg(·) may be a stop-gradient operator. In particular, the first term in VQ can optimize the codebook while the second term can encourage the model to utilize a quantized feature. In some implementations, the system can approximate the first term using exponential moving average (EMA) and can optimize the model using the second term only. To ensure that the codebook contains only high-quality features and contains useful information for reconstruction, EMA may be computed over features extracted from ground truth high-quality images.

In some implementations, the systems and methods can fuse only suitable features in the skip connections into the feature maps of the decoder. Moreover, the system and methods may include a linear gated feature fusion (LGF) block which can integrate information from both encoder and decoder to filter uninformative features. The systems and methods may integrate global information from both features and may filter the feature combination with a confidence score.

The system may let p, $q \in \mathbb{R}^{H \times W \times C}$ represent the features from the corresponding encoder and decoder block respectively. The LGF block may compute:

Global score: $o = \text{DownSample}_r(p+q) \cdot W$

Gated score: $s = \text{UpSample}_r(\text{Sigmoid}(o))$

Fused feature: $q^* = s*(p+q) + (1-s)*q$ (4)

where r can be the window size for downsample and upsample, and $$W \in \mathbb{R}^{\frac{HW}{r^2} \times \frac{HW}{r^2}}$$

can be a linear projection matrix performed on spatial dimensions. The LGF block may use global information to estimate the per-location weight for the fused feature p+q and can then combine the fused feature and decoder features using the predicted weight. The model can therefore learn to disregard unsuitable features from the encoder. Empirically, the system can set $r=2^{log_2H-5}$ when $H>2^5$, otherwise $r=1$.

As reconstruction-based restoration may produce blurry faces, the systems and methods can include adversarial learning to generate crispy and clear faces, as in Equation 1. In some implementations, the system may treat G as a deterministic function where each input x is associated by only one output $\hat{x}=G(x)$. The system can observe that the input x and the output $\hat{x}$ may not be far away from each other. This peculiarity can lead x to become a strong conditional signal where $G(x)$ may largely rely on deep internal features of x (e.g., textures and shapes). The internal skip connections can further intensify those signals. However, as the real degradation functions $Deg(\cdot)$ may be usually unknown, strong conditions may fail representation learning and may prevent the model's generalization ability. The system can include a stochastic restoration model to increase the generation power.

In some implementations, the system can assume G as a stochastic function by introducing a noise term $\epsilon$, $$\hat{x}=G(x,\epsilon), \epsilon \sim N(0,1). \quad (5)$$

Gaussian noise can have a relatively high bandwidth to deal with various degradation scenarios by confining high-dimensional data into a low-dimensional manifold. The technique can be consistent with the intuition that recent facial prior-based techniques can handle more complex cases than training from scratch. In some implementations, the system can include a generic approach by perturbing the correlated low-quality skip features with independent Gaussian noises.

As depicted in FIG. 2, the system can connect the noise signals to two parts: decoder blocks and skip connection blocks. Skip connections can be crucial to maintaining source contents.

In some implementations, the systems and methods can include an adaptive latent gate. For example, the system can let Enc denote the encoder. The system can assume the latent vector $z=Enc(x)$, which can enable conditional noises $\epsilon_c$ by applying a linear soft gate on $\epsilon$:

$$\epsilon_c = \text{Sigmoid}(z)*\epsilon, \epsilon \sim N(0,1) \quad (6)$$

where denotes element-wise multiplication. The formulation can intermediately yield two advantages, specifically for face restoration. Firstly, $\epsilon_c$ can encapsulate the input representation z and thus can impose more content-aware control on the multi-scale features than unconditional random noises. Secondly, in practice, $\epsilon_c$ can be a scaled version of $\epsilon$, which can be gradually learned to implicitly control a single sample's quality by reducing overall samples' variety. Consequently, both can coincide with the goal of content preservation from the perspective of a generative model.

For training, the system can instantiate the face restoration problem (i.e., Equation 1) using the following objective function:

$$\mathcal{L} = \alpha \mathcal{L}_{ADV} + \mathcal{L}_{REC} + \mathcal{L}_{VQ}. \quad (7)$$

The first two terms can be the adversarial generation loss and reconstruction losses and can correspond to the two terms in Equation 1. $\alpha$ can be a hyper-parameter that balances generation and reconstruction.

The system may implement $\mathcal{L}_{ADV}$ using non-saturating loss (Goodfellow et al., 2014) and optimize the model by alternating between Optimize D:

$$\min_D \; -\mathbb{E}_{y \sim Y}\log[D(Aug(y))] \; -\mathbb{E}_{x \sim X}\log[1-D(Aug(G(x)))] \quad (8)$$

Optimize G (partially):

$$\min_G \; -\mathbb{E}_{x \sim X}\log[D(Aug(G(x)))], \quad (9)$$

where D can be the discriminator, and $Aug(\cdot)$ can be the differentiable data augmentation including random color transform and translation. The reconstruction loss can be implemented by $$\mathcal{L}_{REC} = \mathcal{L}_1 + \mathcal{L}_{percep}, \quad (10)$$

where $\mathcal{L}_1$ can be the L1-loss between the target and restored image, and $\mathcal{L}_{percep}$ can be the perceptual loss based on a pre-trained VGG-19 network.

Figure 5:
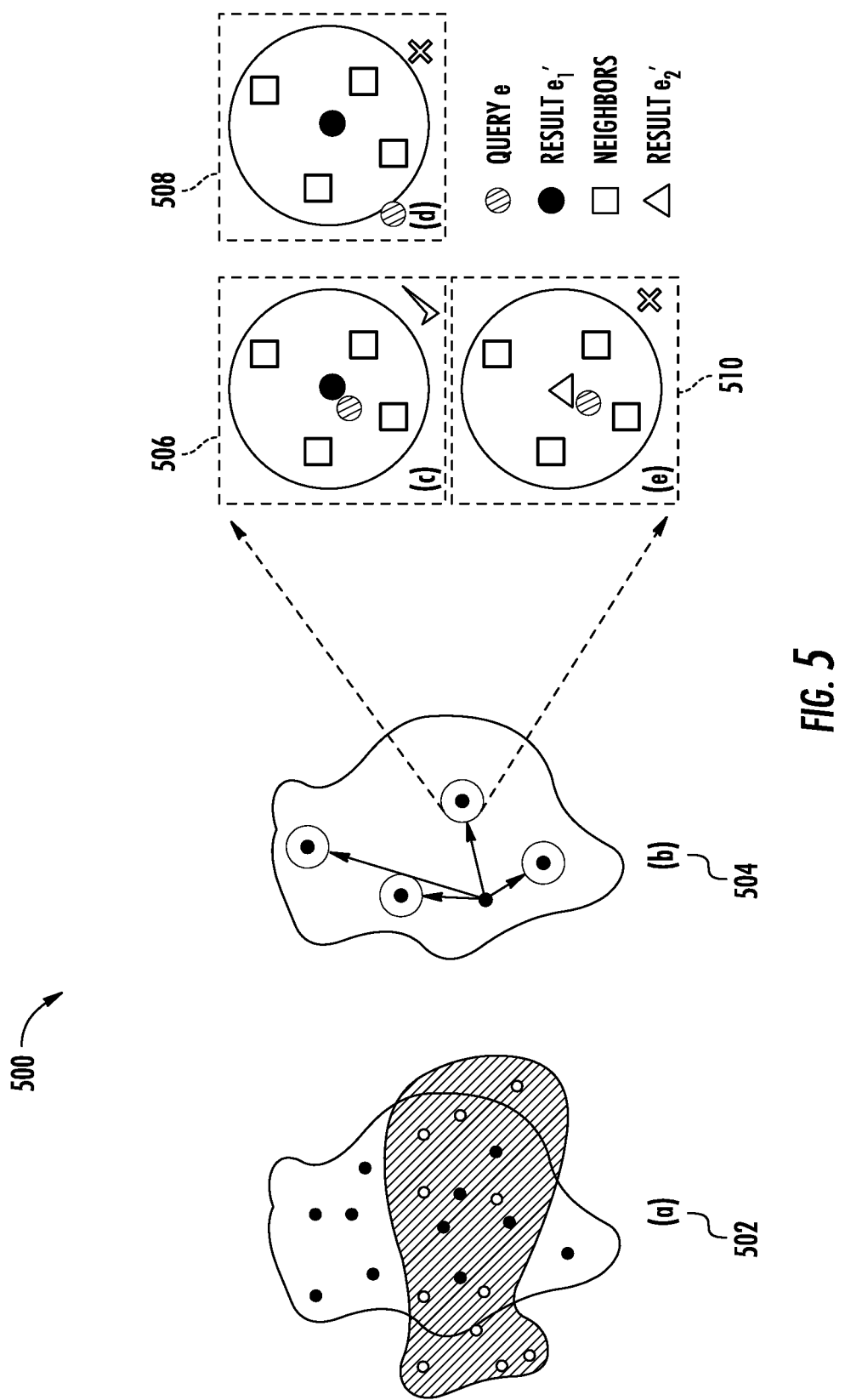
FIG. 5 depicts an illustration of an example metric according to example embodiments of the present disclosure.

The systems and methods may adapt a precision and recall metric to the face restoration tasks to simultaneously measure both perceptual quality and identity preservation. For example, the systems and methods may include two metrics, iPrecision and iRecall, both of which can measure the probability of one distribution falling into another distribution by considering image identities. In particular, iPrecision can measure the probability of generated images overlapping with real images, and iRecall can measure the probability of real images overlapping with generated images. FIG. 5 can depict an example identity-preserved iPrecision metric. The two metrics can naturally conclude the perceptual distance in the feature space such that it can indicate the perceptual quality. By adding identity information, the metric can be more beneficial to evaluate face restoration. The metric evaluation process can include two steps: feature prediction and iPrecision and iRecall.

Feature prediction can include for a pretrained feature extractor, the system can calculate two sets of image embeddings as $\{E_g, E_r\}$, respectively corresponding to the paired restored images and real images. For each feature e, the system can use a face identity-related binary prediction $iPred(\cdot)$ to get a relative prediction in the disjoint set E, e.g., $\{iPred(e_g, E_r)|e_g \in E_g\}$ and $\{iPred(e_r, E_g)|e_r \in E_r\}$, $$iPred(e, E) = \begin{cases} 1(I_e = I_{e'}), \exists \kappa(e, e') \le \kappa(e', NN_k(e', E)) \\ 0, \text{otherwise} \end{cases}$$

where $I_e$, $I_{e'}$ can be face identities, and $NN_k(\cdot)$ can return the kth nearest feature by querying the feature e to the set E. The system can then choose Euclidean distance function as $\kappa(\cdot)$. The prediction can take both feature-level similarity and real face identities into consideration. In some implementations, the whole real image set can be included to measure how realistic the restored image may be.

For iPrecision and iRecall, the system can compute identity-related precision and recall as:

$$iPrecision(E_r, E_g) = \frac{1}{|E_g|}\sum_{e_g \in E_g} iPred(e_g, E_r) \quad (11)$$

$$iRecall(E_r, E_g) = \frac{1}{|E_r|}\sum_{e_r \in E_r} iPred(e_r, E_g). \quad (12)$$

FIG. 5 depicts an illustration of an example metric according to example embodiments of the present disclosure. At 502, the precision metric can measure the portion (e.g., the overlapped area) of restored images that fall into the real images category. At 504, for each restored image, the metrics can determine whether the restoration output falls into the real image manifold by calculating its vectorized feature distance to every real image. At 506, 508, & 510, the charts can show the decision of one restored image e. The metric can consider four neighbors of each real image and can determine whether the identities satisfy $I_e=I_{e'_1}$, $I_e \neq I_{e'_2}$. . . . At 506, e can be the nearest neighbor of $e_1'$, and both may have the same ID. At 508, the chart can show e is not inside the k-nearest neighborhood. At 510, e and $e_2'$ can have different IDs even though e is the nearest neighbor. Out of the charts 506, 508, & 510, only 506 may be considered as a correct match with the iPred metric (e.g., iPred=1).

Example Experiments

Experiments that evaluate the trained models can verify that (1) the method improves face restoration performance, and (2) the evaluation metric better captures the perceptual image quality in face restoration.

Figure 9A:
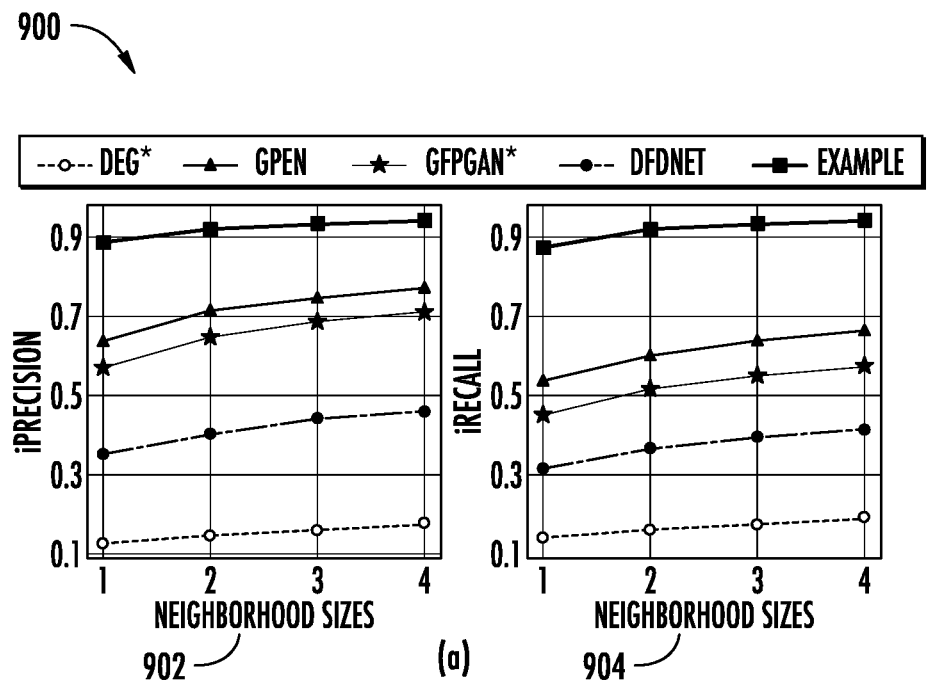
FIGS. 9A-9B depict illustrations of example metric results according to example embodiments of the present disclosure.
Figure 9B:
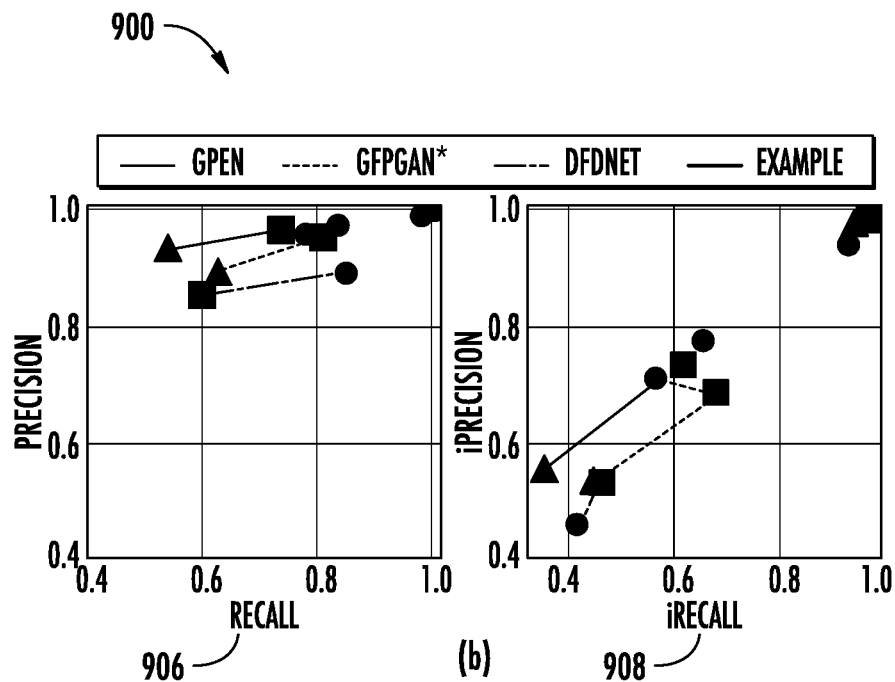

FIGS. 9 A-9 B depict example illustrations of metric results. FIG. 9A can describe iPrecision and iRecall with different neighborhood sizes on BFR. DEG* can indicate the created degraded images. FIG. 9B can describe precision versus recall from various approaches and different tasks. (The circles can denote BFR task, the squares for ×8 SR and the triangles for ×16 SR.). At 902, the neighborhood sizes versus the iPrecision can be depicted. At 904, the neighborhood sizes versus the iRecall can be depicted. At 906, recall versus precision can be depicted. At 908, the iRecall versus the iPrecision can be depicted.

The model may be trained on the full 70K FFHQ and 27K CelebA-HQ training split. The remaining 3K CelebA-HQ images may be used for evaluation. In the experiments, images may be resized to 512×512 with Pillow.Image.LAN-ZCOS filter. The training samples x may be generated from high-quality face images y from the training set using a degradation function, $$x=[(y \otimes k\sigma)_{\downarrow r}+n_\delta]_{JPEG_q} \quad (13)$$

where kσ is the blur kernel with kernel size σ, r denotes the downsample size, $n_\delta$ denotes Gaussian noise with standard deviation δ, and q is the JPEG compression ratio. The system can construct (input, target) image pairs (x, y) and train the model following Equation 7. In some implementations, the system can randomly sample σ, r, δ and q from [0.2, 10], [1, 8], [0, 15] and [60, 100]. The model performance can then be evaluated using (1) standard evaluation metrics including PSNR, SSIM, LPIPS and FID, (2) the iPrecision and iRecall metrics, and (3) user study.

The trained model can then be compared with state-of-the-art approaches on the tasks of Blind Face Restoration (BFR) and Super Resolution (SR).

| | | | | | | | SR | | | |
|---|---|---|---|---|---|---|---|---|---|---|
| | | BFR | | | | PSNR↑ | | LPIPS↓ | | FID↓ |
| Models | PSNR↑ | SSIM↑ | LPIPS↓ | FID↓ | ×8 | ×16 | ×8 | ×16 | ×8 | ×16 |
| DeblurGANv2 | 25.91 | 0.695 | 0.4 | 52.69 | — | — | — | — | — | — |
| PSFRGAN | 24.71 | 0.656 | 0.434 | 47.59 | — | — | — | — | — | — |
| HiFaceGAN | 24.92 | 0.62 | 0.477 | 66.09 | 26.36 | 24.66 | 0.211 | 0.266 | 29.95 | 36.26 |
| DFDNet | 23.68 | 0.662 | 0.434 | 59.08 | 25.37 | 23.11 | 0.212 | 0.266 | 29.97 | 35.46 |
| mGANprior | 24.3 | 0.676 | 0.458 | 82.27 | 21.44 | 21.29 | 0.521 | 0.518 | 104.2 | 100.84 |
| PULSE | — | — | — | — | 24.32 | 22.54 | 0.421 | 0.425 | 65.89 | 65.33 |
| pSp | — | — | — | — | 18.99 | 18.73 | 0.415 | 0.424 | 40.97 | 43.37 |
| GFPGAN | 25.08 | 0.678 | 0.365 | 42.62 | 23.8 | 19.67 | 0.293 | 0.382 | 36.67 | 63.24 |
| GFPGAN* | 24.19 | 0.681 | 0.296 | 38.15 | 24.12 | 21.77 | 0.298 | 0.342 | 34.22 | 37.61 |
| GPEN | 23.91 | 0.686 | 0.331 | 25.87 | 24.97 | 23.27 | 0.322 | 0.361 | 30.49 | 31.37 |
| Example Model | 28.01 | 0.747 | 0.224 | 18.87 | 26.58 | 24.17 | 0.205 | 0.26 | 18.27 | 22.94 |

Table 1 can show the comparison across state-of-the-art models on BFR task. An example disclosed model can achieve the best quantitative numbers on all metrics by a large margin, meaning that example disclosed model can exceed all baselines in both image fidelity and content preservation.

For super resolution, the system can create two sets of evaluation images with resolution 64×64 and 32×32 respectively for ×8 and ×16 SR tasks. The resizing method may follow the original implementation of each approach. As shown in Table 1, an example disclosed model may achieve the best quantitative numbers on most metrics.

To validate whether the metric may be more effective than others in face restoration, the experiment can start by ablating neighborhood size as in FIG. 9(a), (i) Increasing the neighborhood sizes may lead to higher precision and recall by allowing more misses. (ii) The approach may consistently give the best restoration quality even when the system sets the neighborhood size k=1, meaning that restored faces with the approach may be the closest ones among all 3K testing images to the sources. (iii) Varying neighborhood size may not change the ranking order of different methods, demonstrating the robustness of proposed metrics, therefore in the experiments, k=4 can be set. Moreover, as is shown in FIG. 9(b), including hard-coded identity information may produce more discriminative numbers than calculating distances only. For example, low precision and recall can show that the model is very likely to generate a "fake face" of some different person even if the appearance is sharp. The system may use FaceNet as the feature extractor.

| Methods | PSNR↑ | LPIPS↓ | iPrecision↑ | Preference (%)↑ |
|---|---|---|---|---|
| Bicubic | 26.62 | 0.361 | 0.482 | 0.8 |
| GFPGAN | 24.12 | 0.298 | 0.687 | 5.4 |
| GPEN | 24.97 | 0.322 | 0.732 | 7.4 |
| Example | 26.58 | 0.205 | 0.98 | 86.4 |

The example experiments further included a user study to assess the correlation between the metric and human opinions. As is depicted in Table 2, the model can achieve the best result, and the iPrecision can have a better correlation with human opinions. The underlined numbers can convey that the metric is inconsistent with human rates.

| Fusion types | PSNR↑ | SSIM↑ | LPIPS↓ | FID↓ |
|---|---|---|---|---|
| Baseline | 26.85 | 0.71 | 0.251 | 20.02 |
| +LGF | 27.13 | 0.729 | 0.243 | 19.55 |
| +Quantization | 27.35 | 0.737 | 0.238 | 19.77 |
| +Noise | 27.4 | 0.738 | 0.225 | 19.12 |

The example experiments further included ablation studies to understand how each model component affects face restoration performance. For fast validation, the experiments can apply ½ size of a previously used model. The experiment can study the impact of the proposed three techniques: linear gated feature fusion, feature quantization, and noise injection. As is conveyed in Table 3, the techniques can boost the overall performance. In some implementations, the linear gated fusion can be more stable than the other two fusion methods when the system increases the degradation level in training.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for replacing corrupted features with stored high-quality features for image restoration, the system comprising:
   one or more processors; and
   one or more non-transitory computer-readable media that collectively store instructions that, when executed by the one or more processors, cause the computing system to perform operations, the operations comprising:
      obtaining an input image, wherein the input image comprises one or more features;
      processing the input image with a first model to generate a first output, wherein the first model comprises an encoder model;
      processing the first output with a second model to generate a second output, wherein the second model comprises a feature quantization model, wherein the second output results from quantization of the first output by the feature quantization model, wherein the feature quantization model quantizes the one or more features to a code in a codebook and replaces the feature with a stored feature associated with the code, wherein the feature quantization model comprises the codebook, wherein the codebook comprises one or more learned feature codes, and wherein the feature quantization model replaces a corrupted feature with the stored feature of the codebook; and
      processing the second output with a third model to generate a restoration output, wherein the third model comprises a decoder model, and wherein the restoration output comprises an output image.

2. The system of claim 1, wherein the input image comprises a degraded facial image, and wherein the output image comprises one or more predicted pixels.

3. The system of claim 1, wherein the feature quantization model generates a feature embedding based on an input, maps the input to a known feature map, and outputs the second output comprising a known feature of the known feature map.

4. The system of claim 1, wherein the second output comprises latent encoding data, wherein the latent encoding data comprises a latent feature.

5. The system of claim 1, wherein the input image is descriptive of one or more faces, wherein the one or more features are associated with one or more facial features descriptive of the one or more faces.

6. The system of claim 1, further comprising a restoration model, wherein the restoration model comprises the first model, the second model, and the third model, and wherein the restoration model further comprises a plurality of skip connections that generate a plurality of skip connection outputs, wherein the plurality of skip connection outputs are processed by different decoder blocks of the decoder model to generate the restoration output.

7. The system of claim 1, wherein the second output comprises a quantized feature determined based on an extracted feature from the first output.

8. The system of claim 1, wherein processing the first output with the second model to generate the second output comprises:
   processing the first output with a feature extractor to generate a feature vector, wherein the feature vector is a vector mapped to an embedding space;
   determining a stored vector associated with an embedding space location of the feature vector, wherein the stored vector is obtained from a different image than the input image; and
   outputting the second output, wherein the second output comprises the stored vector.

9. The system of claim 1, wherein the third model comprises a linear gated feature fusion block.

10. A computer-implemented method for training an image restoration model that replaces corrupted features with stored high-quality features, the method comprising:
   obtaining, by a computing system comprising one or more processors, a training image, wherein the training image comprises one or more features;

processing, by the computing system, the training image with a restoration model to generate a restoration output, wherein processing the training image with the restoration model comprises:

processing, by the computing system, the training image with an encoder model to generate encoding data;

processing, by the computing system, the encoding data with a feature quantization model to generate latent feature data, wherein the feature quantization model quantizes the one or more features to a code in a codebook and replaces the feature with a stored feature associated with the code, wherein the feature quantization model comprises the codebook, wherein the codebook comprises one or more learned feature codes, and wherein the feature quantization model replaces a corrupted feature with the stored feature of the codebook;

processing, by the computing system, the latent feature data with a decoder model to generate a restoration output;

evaluating, by the computing system, a loss function that evaluates a difference between the restoration output and the training image; and adjusting, by the computing system, one or more parameters of the restoration model based at least in part on the loss function.

11. The method of claim 10, wherein the feature quantization model comprises an embedding feature map, wherein the embedding feature map is associated with a feature quantization map descriptive of quantized features, and wherein processing the encoding data with the encoder model comprises:

generating, by the computing system, a feature embedding based on the encoding data, wherein the feature embedding is an embedding in an embedding space associated with the embedding feature map;

determining, by the computing system, an associated quantized embedding in the feature quantization map based on the feature embedding; and outputting, by the computing system, the latent feature data, wherein the latent feature data comprises the associated quantized embedding.

12. The method of claim 10, wherein the decoder model comprises a feature fusion block, wherein the feature fusion block is configured to fuse the latent feature data and decoder data.

13. One or more non-transitory computer-readable media that collectively store instructions for training an image restoration model that replaces corrupted features with stored high-quality features that, when executed by one or more computing devices, cause the one or more computing devices to perform operations, the operations comprising:

obtaining a training image, wherein the training image comprises one or more features;

processing the training image with a first model to generate a first output, wherein the first model comprises an encoder model;

processing the first output with a second model to generate a second output, wherein the second model comprises a feature quantization model, wherein the feature quantization model quantizes the one or more features to a code in a codebook and replaces the feature with a stored feature associated with the code, wherein the feature quantization model comprises the codebook, wherein the codebook comprises one or more learned feature codes, and wherein the feature quantization model replaces a corrupted feature with the stored feature of the codebook;

processing the second output with a third model to generate a restoration output, wherein the third model comprises a decoder model;

evaluating a loss function that evaluates a difference between the restoration output and the training image; and adjusting one or more parameters of at least one of the first model, the second model, or the third model based at least in part on the loss function.

14. The one or more non-transitory computer-readable media of claim 13, wherein the loss function comprises a realism loss and a reconstruction loss.

15. The one or more non-transitory computer-readable media of claim 14, wherein the realism loss comprises a penalization term that encourages realistic output generation based on a determined realism based in part on a comparison with a real high-quality image.

16. The one or more non-transitory computer-readable media of claim 14, wherein the reconstruction loss comprises a penalization term that penalizes divergence from the training image.

17. The one or more non-transitory computer-readable media of claim 13, wherein the operations further comprise:

generating a low-quality image based in part on the training image; and wherein the low-quality image is processed by the first model to generate the first output.

18. The one or more non-transitory computer-readable media of claim 13, wherein the operations further comprise:

generating a noisy output based on the first output, wherein the noisy output comprises noise; and wherein the noisy output is processed by the second model to generate the second output.

19. The one or more non-transitory computer-readable media of claim 13, wherein the first output is generated based at least in part on a skip connection, wherein the training image is processed by one or more first blocks of the first model to generate the first output, and wherein the skip connection passes the first output from the one or more first blocks of the first model to the second model.

* * * * *